United States Patent [19]

Yamazaki et al.

[11] Patent Number: 4,821,335

[45] Date of Patent: Apr. 11, 1989

[54] ELECTRONIC BLACKBOARD

[75] Inventors: Shuichi Yamazaki, Tokyo; Tatsuo Ishii, Ohmiya, both of Japan

[73] Assignee: Ricoh Company, Limited, Tokyo, Japan

[21] Appl. No.: 848,689

[22] Filed: Apr. 4, 1986

[30] Foreign Application Priority Data

| Apr. 5, 1985 | [JP] | Japan | 60-72060 |
| Apr. 9, 1985 | [JP] | Japan | 60-75184 |
| Apr. 9, 1985 | [JP] | Japan | 60-75185 |
| May 21, 1985 | [JP] | Japan | 60-108535 |
| May 21, 1985 | [JP] | Japan | 60-108536 |

[51] Int. Cl.⁴ .................. G06K 9/00; H04N 1/00
[52] U.S. Cl. .................... 382/53; 358/285; 358/293; 358/296; 382/61; 434/411; 434/429; 434/430
[58] Field of Search ............ 358/296, 285, 293; 382/50, 61, 13, 50, 53, 52; 434/411, 429, 430

[56] References Cited

U.S. PATENT DOCUMENTS

| 4,117,518 | 9/1978 | Skala | 358/296 |
| 4,149,143 | 4/1979 | Nagano et al. | 382/53 |
| 4,219,736 | 8/1980 | Thibodeau | 382/52 |
| 4,300,169 | 11/1981 | Sato | 358/296 |
| 4,364,024 | 12/1982 | Paetsch | 358/296 |
| 4,402,087 | 8/1983 | Sakamoto et al. | 382/53 |
| 4,493,108 | 1/1985 | Fryer et al. | 382/61 |
| 4,574,395 | 3/1986 | Kato | 382/61 |
| 4,587,568 | 5/1986 | Takayama et al. | 358/285 |
| 4,602,293 | 7/1986 | Sekine | 358/285 |
| 4,636,869 | 1/1987 | Tomohisa et al. | 358/296 |
| 4,636,872 | 1/1987 | Prichard | 358/296 |
| 4,667,254 | 5/1987 | Araki et al. | 358/293 |
| 4,670,794 | 6/1987 | Araki et al. | 358/285 |

FOREIGN PATENT DOCUMENTS 0173326   5/1986   European Pat. Off. ............ 358/293

Primary Examiner—Leo H. Boudreau
Attorney, Agent, or Firm—Cooper & Dunham

[57] ABSTRACT

An electronic blackboard includes a writing sheet movable along a predetermined path and having a plurality of writing sections spaced apart one from another, reading means for optically reading the writing sheet, and recording means for recording information read by the reading means of a recording medium as a hard copy. In one aspect, the image information read by the reading means is subjected to thresholding operation to produce a binary image data, and a standard concentration pattern is provided on the recording sheet and it is used to automatically set a proper threshold level to be used in the thresholding operation. In another aspect, it is so structured that the writing sheet may be stopped with one of the plurality of writing sections in registry with or out of registry with a predetermined window. In a further aspect, the writing sheet is normally moved until the next adjacent writing section comes to be in registry with a predetermined window, but the writing sheet may be moved until its last writing section comes to be in registry with the window when so requested. In a still further aspect, the information written on the writing sheet may be recorded on a copy sheet with the information of one writing section on a copy sheet or with the information of two or more writing sections on a copy sheet.

16 Claims, 21 Drawing Sheets

F i g. 1 0 a
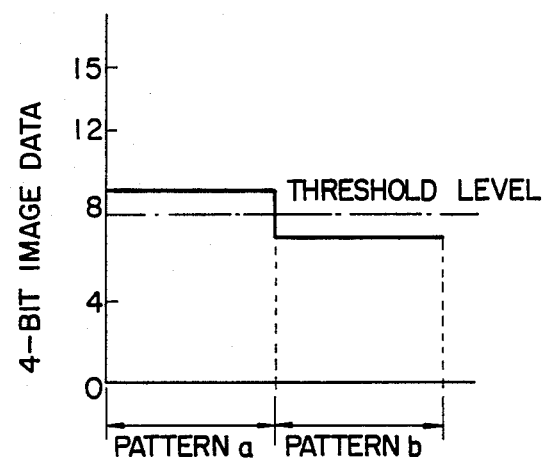
F i g. 1 0 b
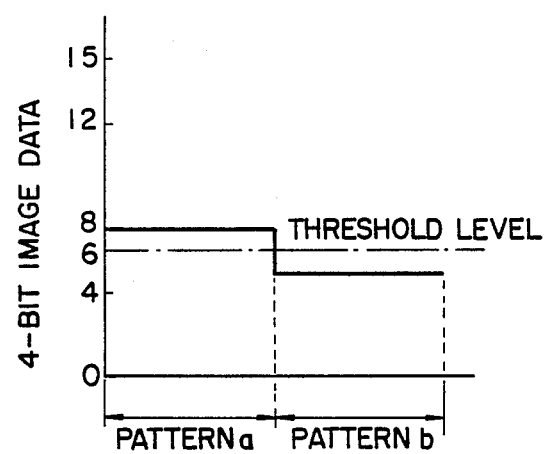

Fig.26a  Fig.26b
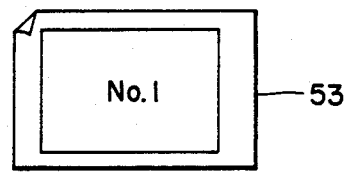 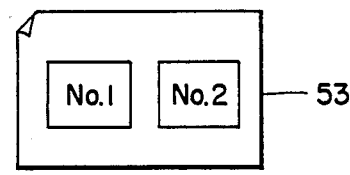
Fig.26c  Fig.26d
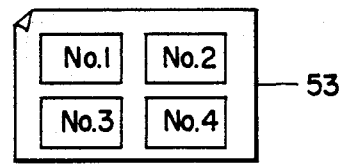 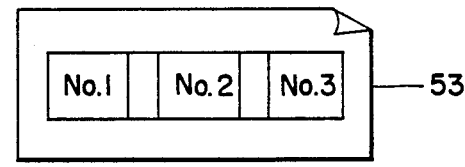
Fig.27a  Fig.27b  Fig.27c
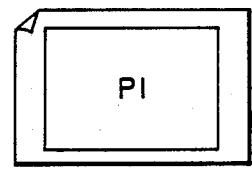 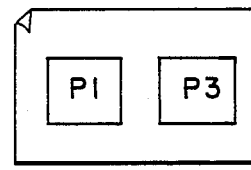 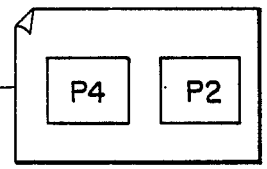
Fig.27d  Fig.27e  Fig.27f
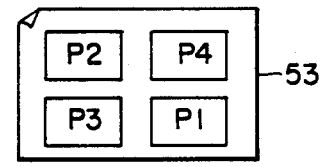 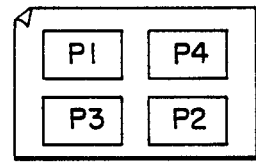 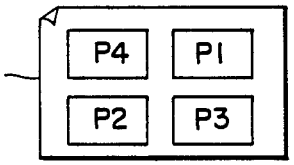
Fig.27g
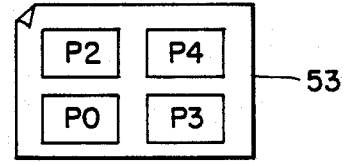

| Fig. 29a | Fig. 29b |
|---|---|

ELECTRONIC BLACKBOARD

BACKGROUND OF THE INVENTION

1. Field of the Invention

This invention generally relates to a panel type recording device for use in conference and class rooms, and, in particular, to an electronic blackboard capable of automatically recording information written on a recording surface.

2. Description of the Prior Art

For many years, a writing panel, such as a blackboard, has been used as an aid in conference, teaching, etc. The writing panel may take the form of a blackboard, though the color may be often actually green, in which case chalk is used as a writing utensil to write information on the blackboard. The writing panel also may take the form of a white panel, in which case a marker containing an eraseable ink is used as a writing utensil. In either case, desired information can be written on the panel and the information can be erased for making the panel available for writing another information. However, the information written on the writing panel cannot be stored or recorded on a separate recording medium.

Under the circumstances, there has been developed a so-called electronic blackboard which is a recordable writing panel capable of recording information written on a writing medium. Such a recordable writing panel device is advantageous since it can produce the information written on the writing panel in the form of a hard copy and thus it is not necessary for somebody to rewrite the information on a separate sheet of paper. In such an electronic blackboard, use is often made of a Charge Coupled Device (CCD) image sensor for reading the information written on the writing medium so as to convert the visual information into an electronic signal. When such a CCD image sensor is used to read the information written on the writing medium, the image data read by the CCD image sensor must be subjected to threshold processing, whereby the analog image data is converted into a binary image data. For this purpose, a threshold level must be properly set.

FIG. 13 shows a typical prior art example for setting such a threshold level for use in converting the analog image data read by a CCD image sensor into a binary image signal. As shown, the prior art system includes a digital comparator 40 which receives at their terminals A0-A3 a digital data, such as 4-bit data, which corresponds to the level of an image data supplied from a CCD image sensor. This digital data is compared with the threshold of the digital comparator 40 to carry out the binary conversion processing of the digital data. In this prior art system, a plurality of switches 41 are provided each connected to the corresponding one of another set of input terminals B0-B3 of the digital comparator 40, and the plurality of switches 41 are manually operated to set the threshold level of the digital comparator 40 to be used for thresholding operation.

However, when the CCD image sensor has been replaced with a new one, or an illumination lamp for illuminating the surface of the writing medium has been replaced with a new one or has deteriorated, the condition for reading the surface of the writing medium changes, which requires to reset the threshold level of the digital comparator 40. In the case of the prior art system shown in FIG. 13, the information on the writing medium must first be recorded on a recording material to see whether or not the reading condition for the CCD image sensor is appropriate or not. Then, based on the quality of the recorded image, the switches 41 may be appropriately operated to change the threshold level of the digital comparator. And, this process is repeated as many times as desired until a desired reading condition is obtained. It is apparent that such a manual adjustment process is cumbersome and time-consuming and it often requires skills and experiences.

SUMMARY OF THE INVENTION

It is therefore a primary object of the present invention to obviate the disadvantages of the prior art as described above and to provide an improved electronic blackboard capable of obtaining an excellent hard copy of information written on a writing medium at all times.

Another object of the present invention is to provide a recordable writing panel device which can electronically store information written on a writing medium.

A further object of the present invention is to provide an improved electronic blackboard capable of setting a threshold level for use in thresholding an image signal read by an image sensor automatically.

A still further object of the present invention is to provide an improved electronic blackboard reliable in operation and convenient to use.

Other objects, advantages and novel features of the present invention will become apparent from the following detailed description of the invention when considered in conjunction with the accompanying drawings.

BRIEF DESCRIPTION OF THE DRAWINGS

FIGS. 9 and 10a and 10b are graphs which are useful for explaining the operation of the embodiment shown in FIG. 8;

FIGS. 26a through 26d are schematic illustrations showing a further mode of operation of the present electronic blackboard;

FIGS. 27a through 27g are schematic illustrations showing several examples of hard copies of information written on the writing medium which may be produced in accordance with this embodiment of the present invention.

DESCRIPTION OF THE PREFERRED EMBODIMENTS

Figure 1:
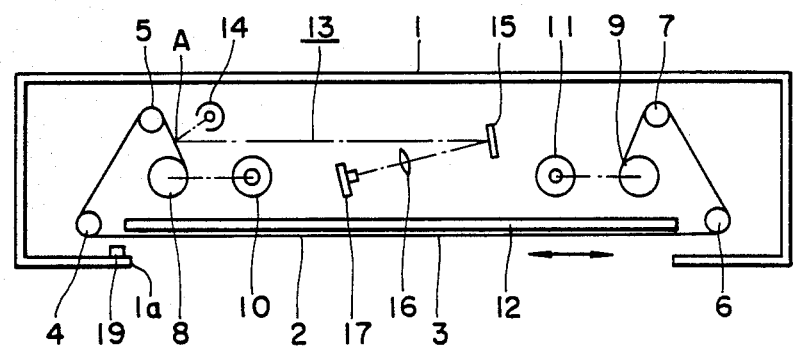
FIG. 1 is a schematic illustration showing an electronic blackboard constructed in accordance with one embodiment of the present invention.

Referring now to FIG. 1, there is schematically shown in cross section an electronic blackboard constructed in accordance with one embodiment of the present invention. As shown, the electronic blackboard includes a housing 1 which is generally rectangular in cross section and which is provided with an opening 1a in its front surface. Inside the housing 1 is provided a writing sheet 2 which is wound around rollers on both ends. The writing sheet 2 has on its front side a writing surface 3 on which information may be written and erased. In the present embodiment, the writing surface 3 is divided into 5 pages and only the first four pages may be recorded as will be made clear later. As shown, the writing sheet 2 extends across the opening 1a of the housing 1 and has its both ends wound around driver rollers 8 and 9, respectively, after passing around guide rollers 4 and 5 and 6 and 7, respectively. These driver rollers 8 and 9 are operatively coupled to pulse motors 10 and 11, respectively, so that the driver rollers 8 and 9 are driven to rotate in the normal direction or the reversed direction, selectively, depending on the direction of rotation of the pulse motors 8 and 9. With the rotation of these driver rollers 8 and 9, the writing sheet 2 moves across the opening 1a and wound around one of the driver rollers 8 and 9 while being unwound from the other.

Also provided in the housing 1 as located behind the writing sheet 2 as extending substantially across the opening 1a and in parallel with the writing sheet 2 is a rear plate 12. Thus, the rear plate 12 serves as a support plate when some information is desired to be written on the writing sheet 2. The writing sheet 2 is normally moved from the right to the left across the opening 1a so that the writing sheet 2 is wound around the driver roller 8 as being unwound from the other driver roller 9. Also provided in the housing 1 is an image reading means 13 for reading an image written on the writing sheet 2 by scanning across its widthwise direction, i.e., from top to bottom, at a position A between the guide roller 5 and the driver roller 8. Described more specifically, a fluorescent lamp 14 is provided near the position A so that the writing surface A is slit-scanned at the position A. And, the light reflecting from the position A is led into a CCD image sensor 17 through a mirror 15 and a lens 16 so that the CCD image sensor 17 converts the optical image formed thereon into an electrical signal. The image on the writing surface 3 thus read by the CCD image sensor 17 is then stored or printed on a sheet of paper, for example, by a thermal printer (not shown in FIG. 1) which may also be provided in the electrical blackboard.

Figure 2:
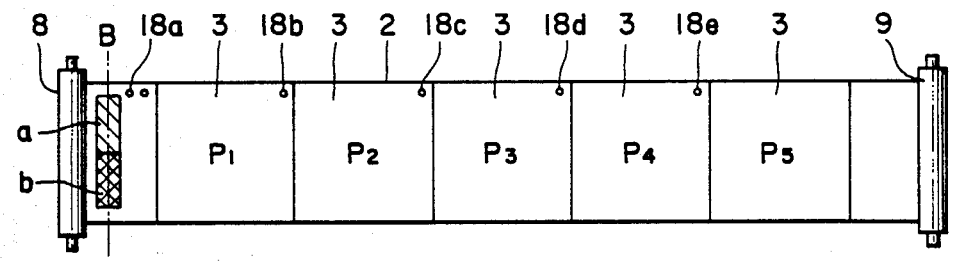
FIG. 2 is a schematic illustration showing a writing sheet provided in the electronic blackboard shown in FIG. 1.

FIG. 2 shows the overall structure of the writing sheet 2 as developed between both of the driver rollers 8 and 9. In the illustrated embodiment, the writing surface 3 is divided into five pages $P_1$ through $P_5$ in succession, but since page 5 $P_5$ cannot be moved past the slit-scanning exposure position A, the information written on page 5 $P_5$ cannot be read by the CCD image sensor 17 and thus any hard copy of the image on page 5 $P_5$ cannot be produced. Thus, only the information on pages $P_1$ through $P_4$ can be produced in the form of hard copy. The writing sheet 2 is provided with a plurality of detector holes 18, one for each corresponding page and located in front of each corresponding page. And, these detector holes 18 may be detected by a sensor 19 mounted on the housing 1 at the left side edge of the opening 1a as they move past the sensor 19. In the present embodiment, the detector hole 18a for the first page $P_1$ differs in structure from the rest 18b through 18e and it is comprised of two holes arranged side-by-side thereby allowing to identify that the next page to be read is the first page $P_1$. With this structure, at the time of initialization after power up, the first page $P_1$ of the writing surface 3 can be easily found by looking for the unique detector hole 18a in order to set the writing sheet 2 in its initial position.

Figure 3:
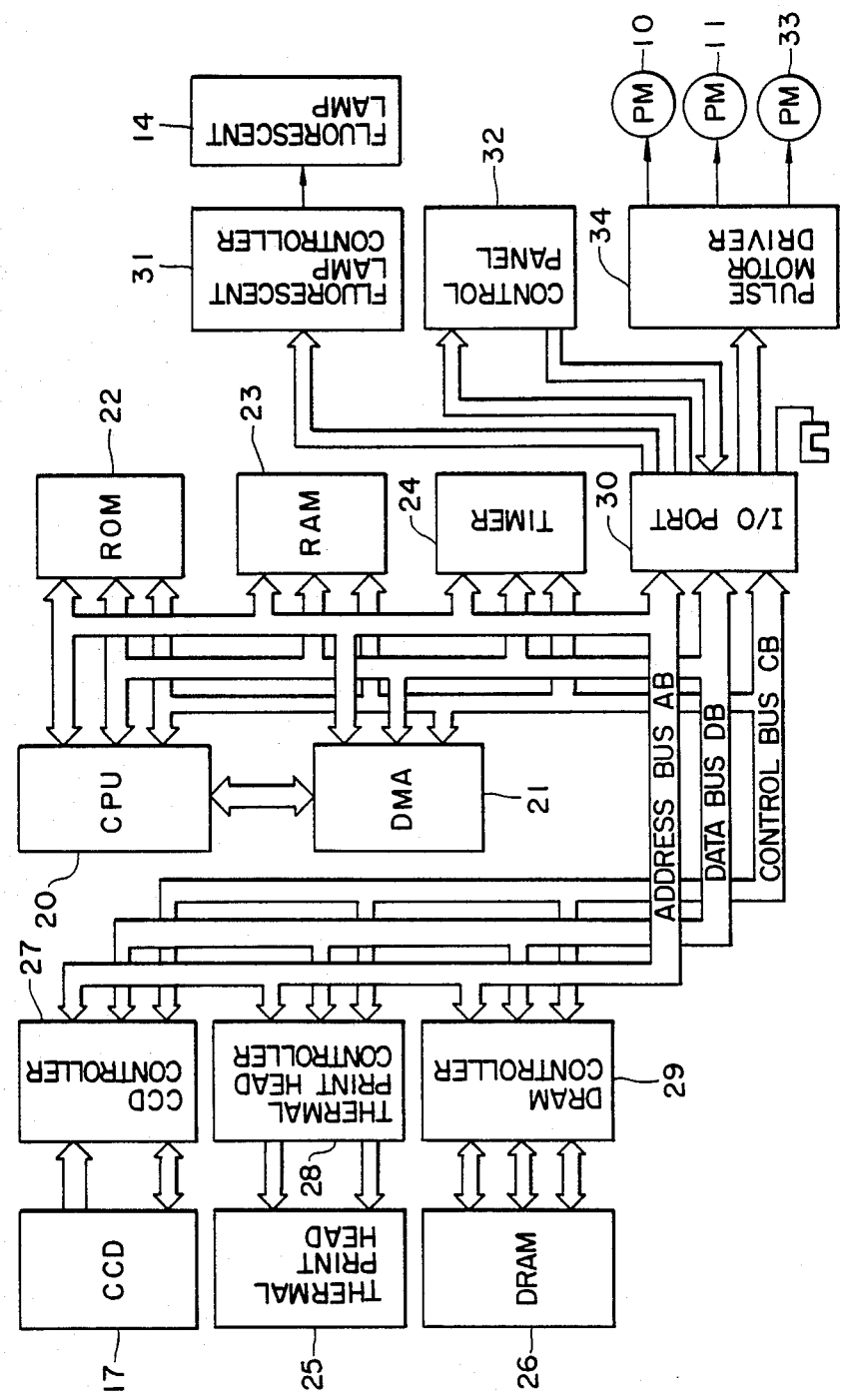
FIG. 3 is a block diagram showing an overall control system provided in the electronic blackboard shown in FIG. 1.
Figure 4:
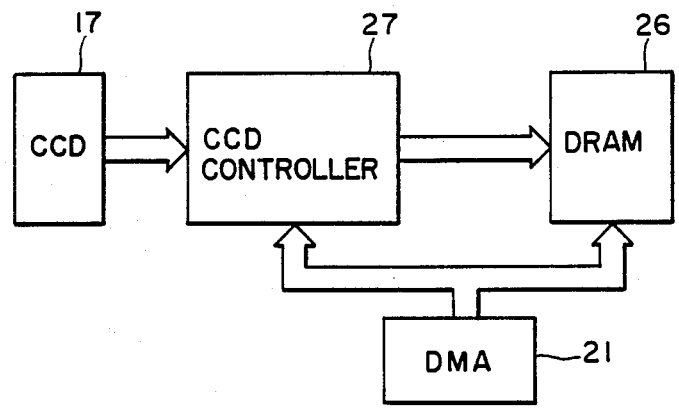
FIGS. 4 through 6 are block diagrams showing how signals are transmitted between selected elements shown in FIG. 3.
Figure 5:
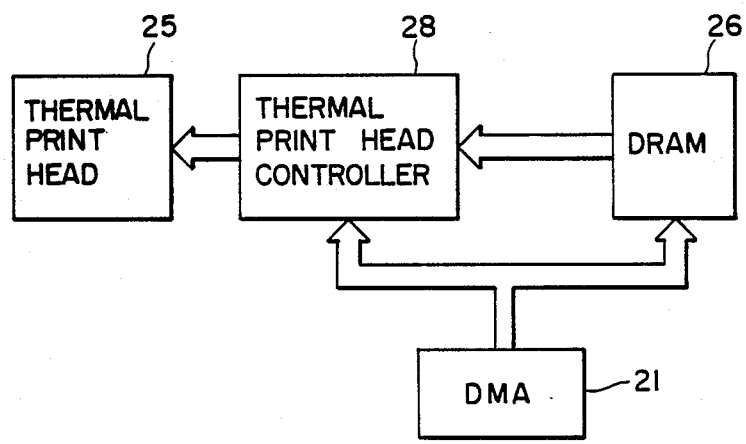
Figure 6:
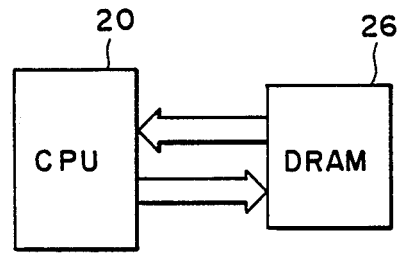

Next, FIG. 3 shows an overall control circuit provided in the electronic blackboard of FIG. 1. As shown, the control circuit includes a central processing unit or simply CPU 20 which is connected to a direct memory access or simply DMA controller 21. Also provided are a read only memory or simply ROM 22, a random access memory or simply RAM 23 and a timer 24 which are operatively connected to CPU 20 and DMA 21 through an address bus AB, a at a bus DB and a control bus CB. The CCD 17, a thermal print head 25 and a dynamic random access memory or simply DRAM 26 are also provided as connected to the CPU 20 and the DMA 21 through the address bus AB, data bus DB and control bus CB through respective controllers 27, 28 and 29. Thus, the DMA 21 serves to transfer image data from the CCD 17 directly to the DRAM 26 (see FIG. 4), and also data may be transmitted from the DRAM 26 directly to the thermal print head 25 (see FIG. 5). In addition, there is provided an I/O port 30 as connected to the CPU 20 and the I/O port 30 is connected to a fluorescent lamp controller 31 for controlling the operation of the fluorescent lamp 14, to an operating section or control panel 32 and to a pulse motor driver 34 for controlling the operation of the pulse motors 10, 11 and a pulse motor 33 which functions to transport thermosensitive paper.

Figure 7:
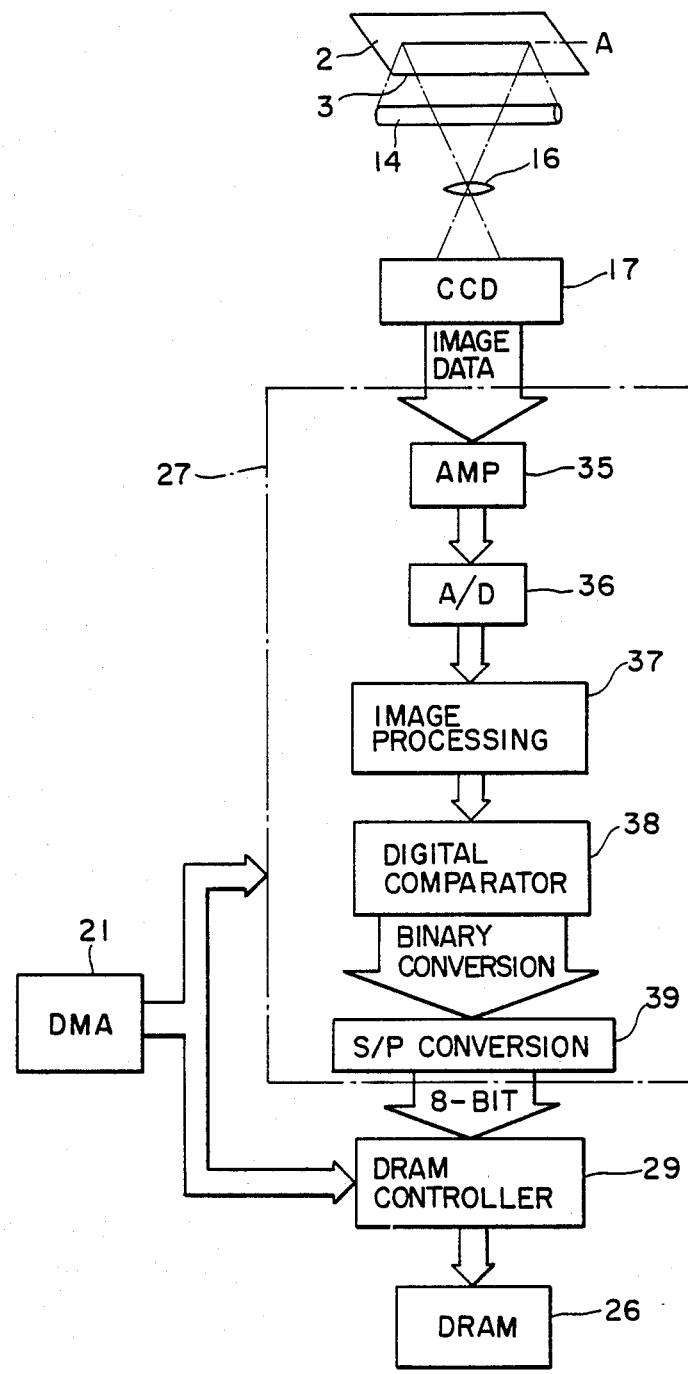
FIG. 7 is an illustration showing the sequence of steps in processing a visual image read by a CCD image sensor.

FIG. 7 schematically shows the specific structure of the CCD controller 27. As shown, an image data read from the writing surface 3 by the CCD image sensor 17 is converted into an electrical image signal which is then amplified by an amplifier 35, converted into digital data by an A/D converter 36, and subjected to image processing by an image processing circuit 37. Then, the signal output from the image processing circuit 37 is converted into a binary image signal by a digital comparator 38, and the binary image signal is then converted into an 8-bit parallel signal as being processed by a serial-to-parallel converting circuit 39. This 8-bit parallel signal is then supplied to the DRAM 26. In this manner, under the control of the DMA 21, the image data from the CCD image sensor 17 is stored into the DRAM 26 directly.

Figure 8:
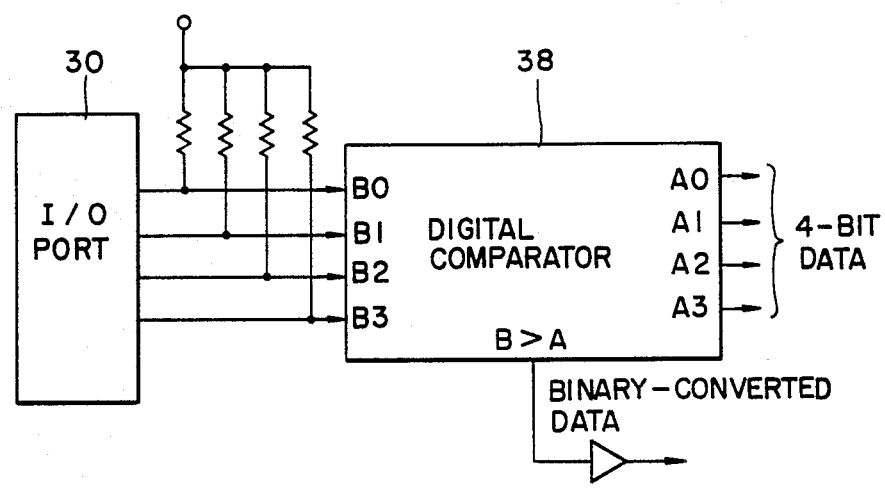
FIG. 8 is a schematic illustration showing partly in blocks the structure of an embodiment capable of adjustable setting, a threshold level in accordance with the present invention.

When the digital image data is converted into a binary image data by the digital comparator 38, the digital image data is compared with a threshold level set in the digital comparator 38. And, in accordance with one aspect of the present invention, this threshold level to be used in thresholding operation at the digital comparator 38 is automatically adjusted in accordance with the conditions for scanning an image on the writing sheet 2. Such a structure for automatically setting a threshold level for thresholding operation of digital image data constructed in accordance with one embodiment of the present invention is schematically shown in FIG. 8. As shown, the I/O port 30 is directly connected to the digital comparator 38 for controlling the threshold level to be used in thresholding operation of digital image data. In this connection, as shown in FIG. 2, the writing sheet 2 to be used in this embodiment is provided with a standard concentration pattern comprised of a light standard pattern section a and a dark standard pattern section b at a reference line B located in a non-imaging section of the writing sheet 2, or slightly in front of the first page $P_1$ of the writing sheet 2 in the illustrated embodiment.

Figure 9:
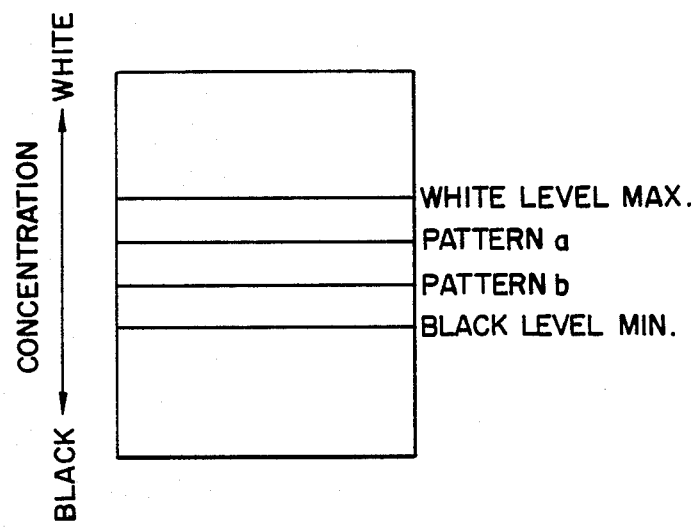

Assuming that the upper limit in the level of concentration for a white area when reproduced on a hard copy is denoted by $WHITE_{max}$ and the lower limit in the level of concentration for a black area when reproduced on a hard copy is denoted by $BLACK_{min}$, the level of concentration for each of the light and dark standard pattern sections a and b is set such that the level of concentration for pattern a is equal to or lower than $WHITE_{max}$, the level of pattern a is higher than the level of pattern b, and the level of pattern b is equal to or higher than $BLACK_{min}$, as graphically shown in FIG. 9. Thus, in accordance with this embodiment, the threshold level to be used in the digital comparator 38 is advantageously determined using these standard light and dark pattern sections a and b provided in the non-imaging section of the writing sheet 2. That is, when the threshold level is to be determined using the light and dark standard pattern sections a and b of the writing sheet 2, a mean concentration level between the light and dark standard pattern sections a and b is advantageously set as the threshold level, thereby rendering those digital image data having the concentration levels equal to or higher than the mean concentration level to be black image data (one of the two binary states) and those digital image data having the concentration levels lower than the mean concentration level to be white image data (the other of the two binary states).

With this structure, even if the scanning condition or the condition for optically reading the information on the writing sheet 2 varies, for example, due to replacement of fluorescent lamps 14 and/or CCD image sensors 17, and/or decay of light intensity of the fluorescent lamp 14, since the light and dark standard pattern sections a and b are always monitored from time to time, for example, prior to a series of operations of reading a predetermined number of pages on the writing sheet 2, the threshold level is automatically adjusted at all times to allow to obtain an excellent hard copy of any information written on the writing sheet 2.

Figure 11:
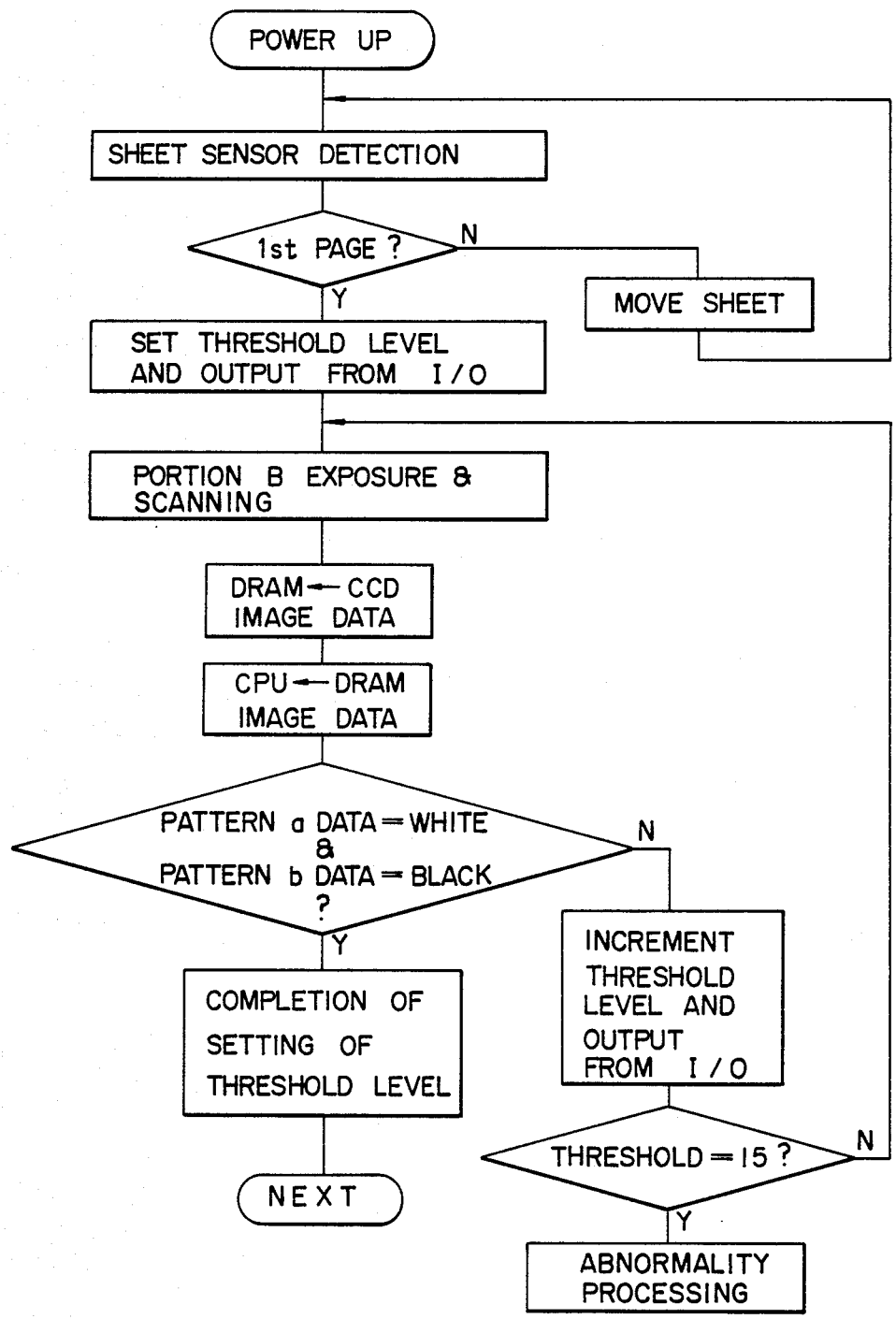
FIG. 11 is flow chart showing the sequence of steps in carrying out the setting of threshold level in an automatic fashion.

The sequence of operation for automatically adjusting the threshold level in accordance with this embodiment having the above-described structure will be described in detail below with reference to a flow chart shown in FIG. 11. Upon power up, an initialization step is carried out so as to set the writing sheet 2 at its initial position. That is, with the page sensor 19, the detector holes 18a–18e are detected as the writing sheet 2 moves in the direction indicated in FIG. 1, and the writing sheet 2 is moved until the first page $P_1$ is located in registry with the opening 1a. In this event, since the detector holes 18a for the first page $P_1$ are differently constructed from the rest, locating and positioning of the first page $P_1$ can be carried out with ease. Then, as the threshold level, "1" (which is a 4-bit data and thus corresponds to "0001") is set, which is output to the digital comparator 38 from the I/O port 30. With the writing sheet 2 being initialized in position, or the first page $P_1$ of the writing sheet 2 being located in registry with the opening 1a, the reference line B of the writing sheet 2 comes to be located in registry with the exposure position A. Under the condition, the reference line B is illuminated by the fluorescent lamp 14 and the light and dark standard pattern sections a and b are optically read by the CCD image sensor 17 and the image data is stored into the DRAM 26.

The image data of the light and dark standard patterns a and b stored in the DRAM 26 is then read out by the CPU 20 for checking whether or not the currently set threshold level is proper. That is, supposing that the image data obtained from the light standard pattern section a turns out to be converted into the binary image data indicating white when processed by the digital comparator 38 and the image data obtained from the dark standard pattern section b turns out to be converted into the binary image data indicating black when processed similarly, the currently set threshold level, i.e., "1", is determined to be proper. However, if both of the image data from the light and dark standard pattern sections a and b have been converted into the same binary image data indicating, for example, white, then the currently set threshold level, i.e., "1", is determined to be not proper. Thus, the threshold level is incremented by +1 to become "2" (corresponding to "0010"), which is then supplied to the digital comparator 38 through the I/O port 30, and, again, it is similarly checked whether or not this modified threshold level having the value of "2" is proper or not using the data from the light and dark standard pattern sections a and b. For example, in the case of FIG. 10a, it will be indicated proper when the threshold level is set at "8" (corresponding to "1000") because this will cause the pattern a to be indicated white and the pattern b to be indicated black. On the other hand, in the case of FIG. 10b, the threshold level must be set at "6" (corresponding to "0110") so as to allow the pattern a to indicate white and the pattern b to indicate black. In this manner, in accordance with this embodiment of the present invention, even if there occurs fluctuations in scanning condition, such as decay in the amount of irradiation of the fluorescent lamp 14, the threshold level to be used at the digital comparator 38 is always adjusted at a proper level at all times, thereby eliminating the need of any cumbersome manual adjustments and insuring excellent optical reading of information written on the writing sheet 2 and production of excellent hard copies of the information written on the writing sheet 2.

In accordance with the above-described embodiment, the threshold level is set using a 4-bit binary data so that the threshold level may be varied over fourteen steps between "1" and "14" (corresponding to "0001" and "1110"). It is to be noted that "0000" and "1111" are reserved because they may be needed for patterns a and b. If it has been turned out that the threshold level cannot be set within this range, it is decided that abnormality exists and a predetermined abnormality processing is carried out. Since the need for adjustment of the threshold level arises also when any abnormality condition occurs, for example, the fluorescent lamp 14 is not lit or irradiates excessively, or the CCD 17 and/or DRAM 26 malfunctions, the present embodiment also serves to detect the presence of any abnormality condition during the initialization step for setting the threshold level properly. With such an abnormality detecting function, reading of information written on the writing sheet 2 optically using the CCD image sensor 17 with the presence of abnormality therein can be prevented from taking place.

Figure 12:
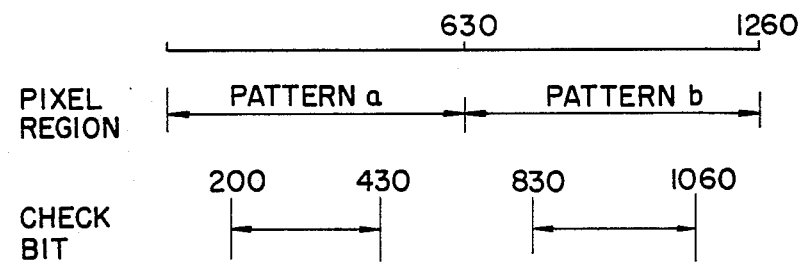
FIG. 12 is a schematic illustration showing how the automatic setting of threshold level is carried out in the preferred mode.
Figure 13:
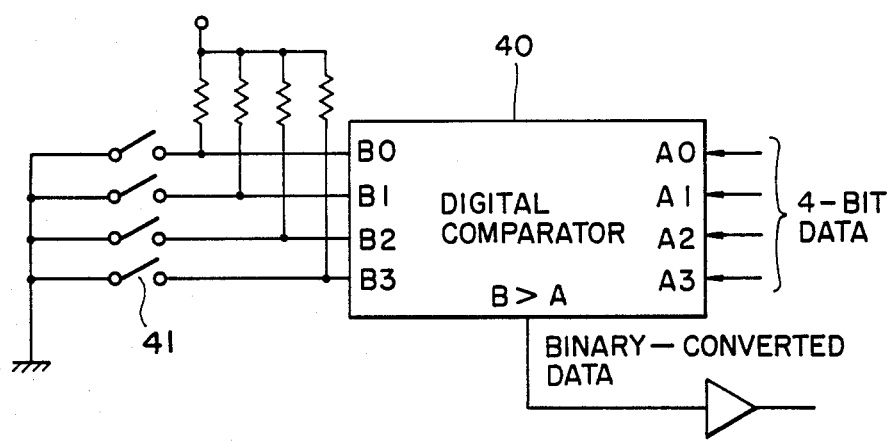
FIG. 13 is a schematic illustration showing a typical prior art system for manually setting the threshold level for use in thresholding an image data read by a CCD image sensor.

The preferred embodiment for optically reading the standard pattern sections a and b will be described with reference to FIG. 12. In the present embodiment, there are 1,260 bits of data or pixels to be read along one scanning line of the CCD image sensor 17. And, the light and dark standard pattern sections a and b are so arranged along the reference line B of the writing sheet 2 that the pattern a corresponds to the pixels of 1st to 630st bits and the pattern b corresponds to the pixels of 631st to 1,260st bits. And, the data of 200th to 430st bits are used for obtaining the image data for the pattern a and the data of 830st to 1,060st bits are used for obtaining the image data for the pattern b because of presence of scatter of data. More in detail, in consideration of scatter among pixels of the CCD image sensor 17 and non-uniformity in the distribution of irradiation by the fluorescent lamp 14, the 230 data for each of the patterns a and b are averaged to obtain a representative image data for each of the patterns a and b.

As described above, in accordance with this embodiment of the present invention, provision is made of at least one reference or standard concentration pattern in the non-image section of the writing sheet, and this standard pattern is optically read and processed to adjust the threshold level to a proper value automatically. Thus, there is no need to set the threshold level manually in an assembly line and no maintenance service for manually altering the threshold level due, for example, to deterioration of the light source is required. In this embodiment of the present invention, the threshold level is automatically adjusted at all times so that hard copies of information written on the writing sheet 2 can be reproduced in an excellent condition without failure. Besides, this threshold adjustment step also serves to detect any presence of abnormality condition, such as malfunctioning of light source and/or image sensor.

Figure 14:
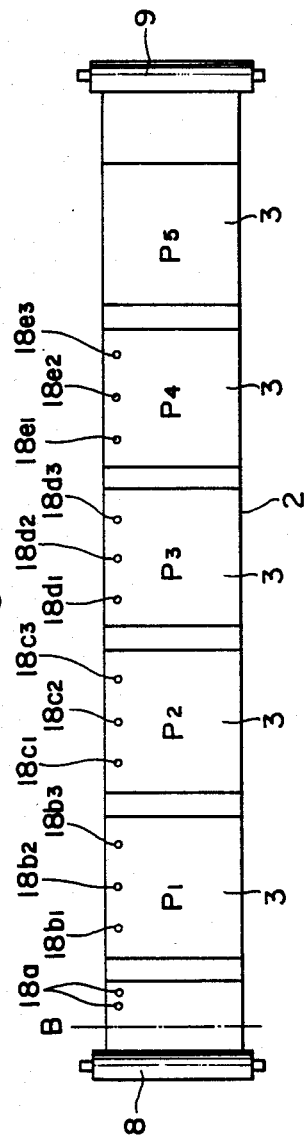
FIG. 14 is a schematic illustration showing a writing sheet constructed in accordance with another embodiment of the present invention for use in the electronic blackboard shown in FIG. 1.

FIG. 14 shows a writing sheet 2 constructed in accordance with another embodiment of the present invention also for use in the electronic blackboard shown in FIG. 1. The writing sheet 2 shown in FIG. 14 is similar in many respects to the writing sheet 2 shown in FIG. 2, and thus like elements are indicated by like numerals. However, the writing sheet 2 of FIG. 14 is not provided with the standard pattern sections a an b at the reference line B. Thus, the reference line B of the writing sheet 2 of FIG. 14 has a background concentration level same as that of each of writing pages $P_1$ through $P_5$. In addition, in the writing sheet 2 of FIG. 14, a plurality of detector holes (three in the illustrated embodiment) are provided for one page, such as $18b_1$, $18b_2$, and $18b_3$, as spaced apart from one another in the longitudinal direction of the writing sheet 2, thereby allowing the writing sheet 2 to be stopped in a more refined stepwise fashion. Other than these two points, the writing sheets 2 shown in FIGS. 2 and 14 are identical in structure.

Figure 15:
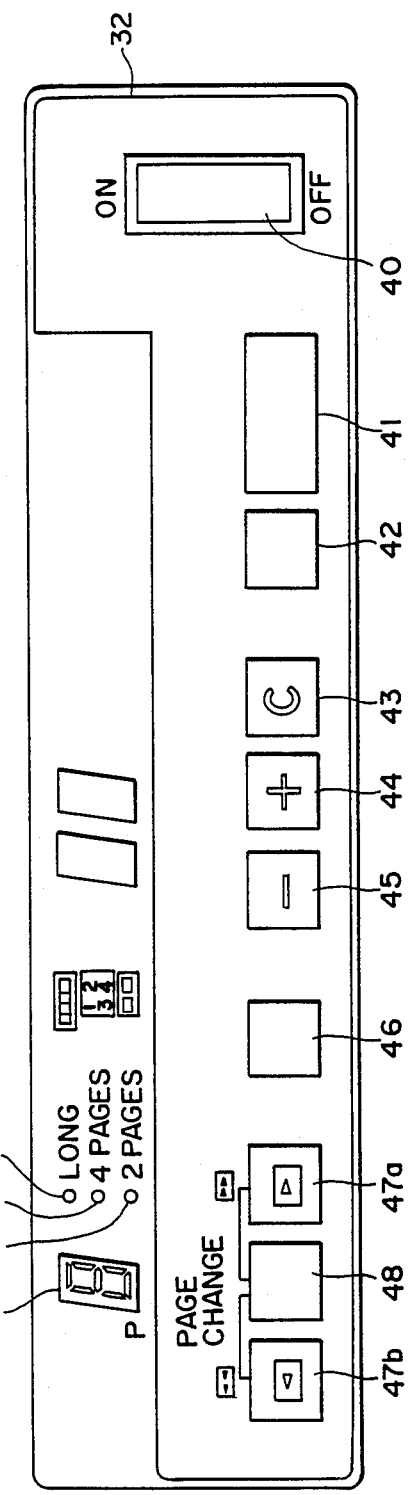
FIG. 15 is a schematic illustration showing the overall structure of a control panel which may be advantageously used in the electronic blackboard.

The structure of a control panel 32 preferably used in combination with the writing sheet 2 shown in FIG. 14 is schematically shown in FIG. 15. As shown, the control panel 32 is provided with a power switch 40, a copy start key 41, a stop key 42 for stopping the movement of the writing sheet 2, a clear key 43, a "+" key 44, a "−" key 45, a copy mode key 46 for designating the copy mode, page change keys 47a and 47b for moving the writing sheet 2 in the forward or backward direction, and a continuous page change key 48 for moving the writing sheet 2 over several consecutive pages. The control panel 32 is also provided with a long copy mode indicator 49, a 4-page copy mode indicator 50, and a 2-page copy mode indicator 51. In the long copy mode, two or more pages of information on the writing sheet 2 are reproduced on a long sheet of copy paper arranged side-by-side in a line; whereas, in the 4-page or 2-page copy mode, four or two pages of information written on the writing sheet 2 are reproduced on the same sheet of copy paper of predetermined size. Moreover, the control panel 32 is also provided with a page indicator 52 which indicates the number of the page located at the opening 1a.

Figure 16:
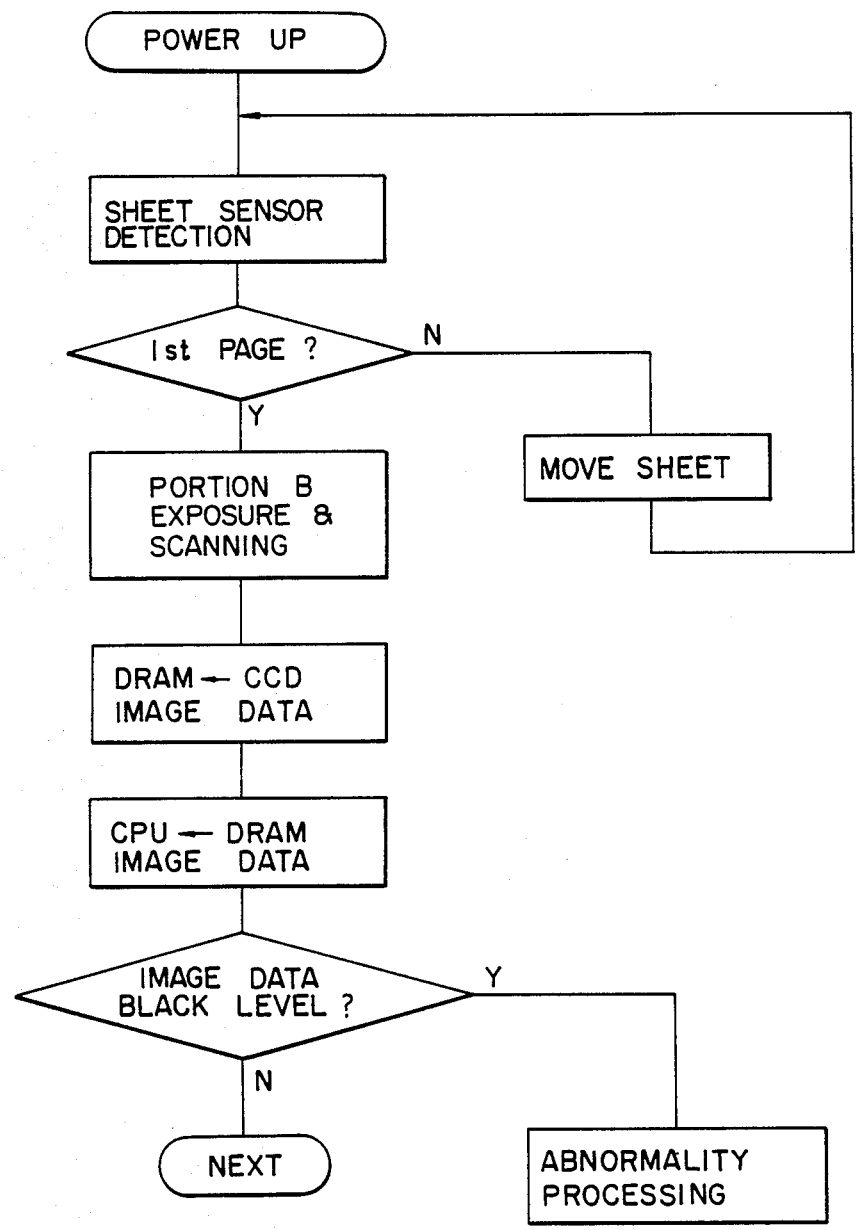
FIG. 16 is a flow chart showing the sequence of steps of making copies of information written on the writing medium of the electronic blackboard.

The operation of the electronic blackboard using the writing sheet 2 shown in FIG. 14 will be described with reference to the flow chart shown in FIG. 16. Upon power up, an initialization step for setting the writing sheet 2 of FIG. 14 at its initial position is carried out. That is, the detector holes 18a–18e for each page of the writing surfaces 3 are detected by the sensor 19 and the writing sheet 2 is moved until the first page $P_1$ comes to be located in registry with the opening 1a. As described previously, since the detector hole 18a is constructed differently from the other detector holes, the first page $P_1$ easily located to be in registry with the opening 1a. Under the condition, the reference line B of the writing sheet 2 comes to be located in registry with the exposure position A. Since the reference line B is located in the non-imaging area of the writing sheet 2, it has a background concentration or white level. Under the condition, the section of the reference line B is illuminated by the fluorescent lamp 14 and optically read by the CCD image sensor 17, which thus produces an image data to be stored into the DRAM 26. The image data thus stored in the DRAM 26 is then read out by the CPU 20, which examines the image data and determines it to be proper if it has a white level concentration and to be not proper if it has a black level concentration. When the image data has been indicated to have a black level concentration, it is likely that the fluorescent lamp 14 has not been lit and/or CCD image sensor 17 and/or DRAM 26 has been malfunctioning, so that any such abnormality condition may be detected.

Figure 17A:
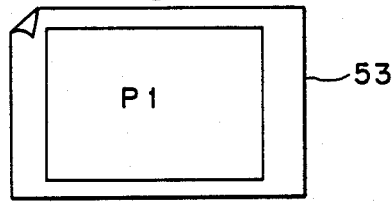
FIGS. 17a through 17d are schematic illustrations showing several modes of making hard copies of information written on the writing medium of the electronic blackboard.
Figure 17B:
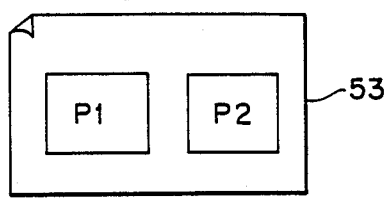
Figure 17C:
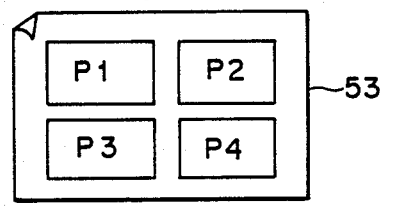
Figure 17D:
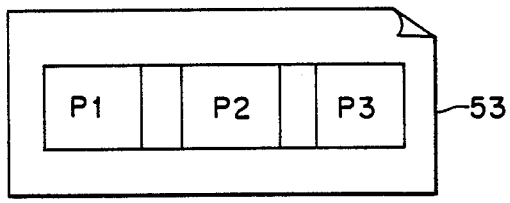

As described above, by operating the control panel 32 of the present electronic blackboard, a hard copy of any information written on any of the writing surfaces 3 may be produced in various modes. This aspect of the present embodiment will now be described with particular reference to FIGS. 17a through 17d. FIG. 17a illustrates a standard copy mode, in which any information written on one page, first page $P_1$ in the illustrated example, of writing surface 3 is reproduced on a single sheet of copy paper 53 of a predetermined size on a one-to-one basis. FIG. 17b shows a 2-page copy mode, in which two pages, first and second pages $P_1$ and $P_2$ in the illustrated example, of information written on the writing sheet 2 are reproduced on a single sheet of copy paper 53 as reduced by half. In addition, FIG. 17c shows a 4-page copy mode, in which four pages, first through fourth pages $P_1$ through $P_4$ in the illustrated example, of information written on the writing sheet 2 are reproduced on a single sheet of copy paper 53 as reduced by ¼. On the other hand, FIG. 17d shows a long copy mode, in which two or more consecutive pages of information written on the writing sheet 2, including the spacing between the two adjacent pages, are reproduced on a long sheet of copy paper 53 as appropriately reduced in size.

Figure 18:
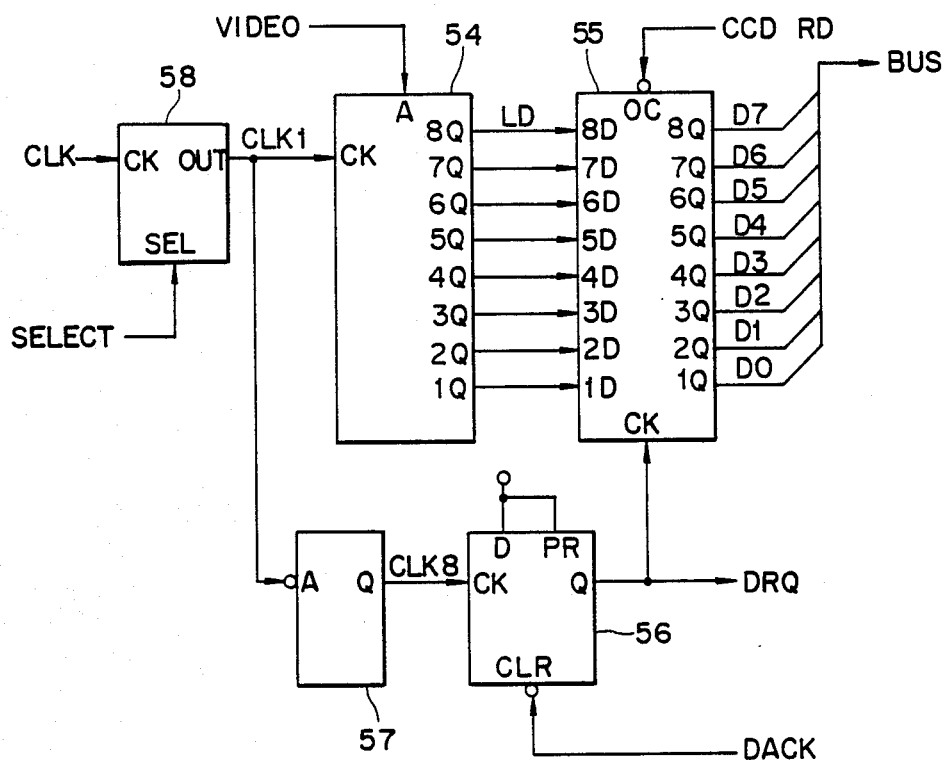
FIG. 18 is a block diagram showing part of the electrical structure of an electronic blackboard constructed in accordance with one embodiment of the present invention.

In order to carry out the above-described various modes of operation, the electronic blackboard is required to be provided with a reduction function to reduce the size of an optically read image appropriately. For this purpose, in one embodiment of the present invention, the CCD controller 27 is provided with a size reduction circuit as shown in FIG. 18. Described in detail with reference to FIG. 18, an image data VIDEO from the CCD image sensor 17 is input into a shift register 54 at its terminal A in synchronism with a clock signal. The shift register 54 receives the image signal VIDEO serially and it outputs an 8-bit parallel image signal LD. An 8-bit D-type flip-flop 55 is connected in parallel to the shift register 54. The flip-flop 55 has a clock terminal CK, to which a D-type flip-flop 56 is connected. The flip-flop 56 has a clear terminal, which receives a DACK (DMA acknowledge) signal, which, in turn, turns to low level upon start of operation of the DMA 21. The flip-flop 56 also serves to clear a request signal DRQ of DMA controller 29. The flip-flop 56 is also connected to a divide-by-8 counter 57, and a frequency divider 58 is connected to both of the divide-by-8 counter 57 and the serial-to-parallel shift register 54. When a copy mode requiring a size reduction is set, a copy mode selection signal SELECT becomes low level, thereby activating the frequency divider 58 to provide a frequency-divided clock signal.

Figure 19:
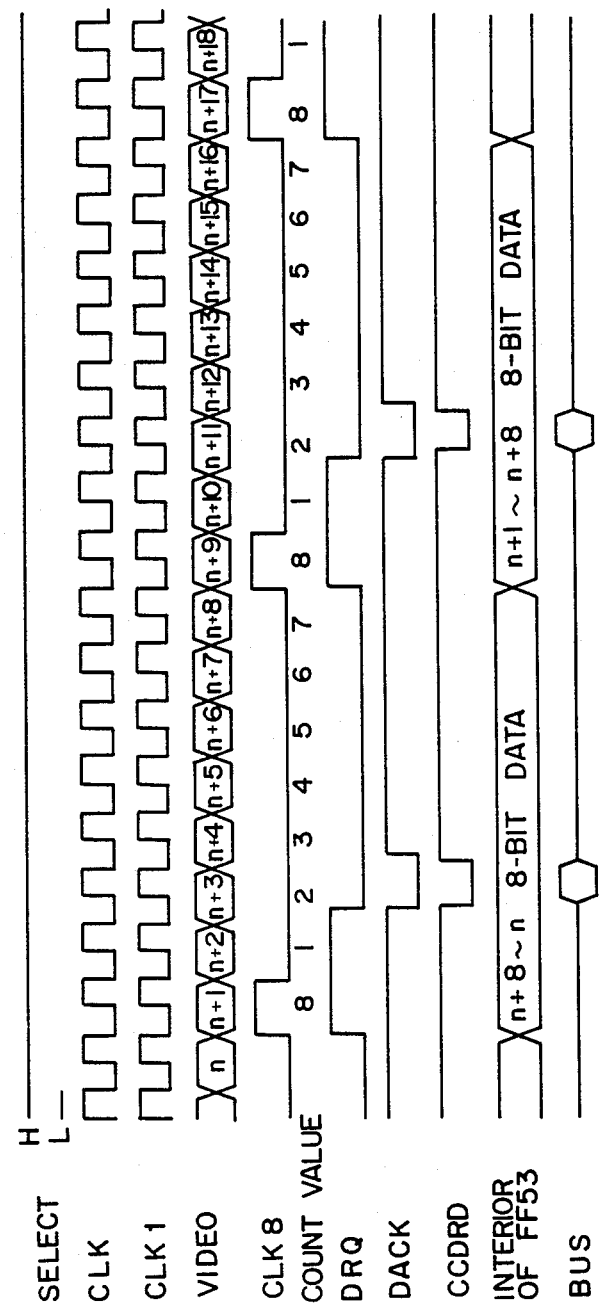
FIGS. 19 and 20 are timing charts which are useful for explaining the operation of the structure shown in FIG. 18.

With this structure, a standard copy mode of operation will be described with reference to the timing chart shown in FIG. 19. The image data VIDEO from the CCD image sensor 17 is supplied in association with the clock signal CLK. If the standard copy mode is set, the SELECT signal is at high level, so that the frequency divider 58 is kept inoperative and thus CLK1 is identical to CLK. The signal VIDEO supplied to the input terminal A of the shift register 54 is shifted gradually from bit 8Q to 7Q to 6Q, . . ., and finally to 1Q in association with the rising edge of the CLK1 clock signal. The clock signal CLK1 is also supplied to the divide-by-8 counter 57 at the same time, so that the signal DRQ becomes high level every 8 counts. Associated with the rising edge of this signal DRQ, the output data LD from the shift register 54 is latched into the flip-flop 55. The signal DRQ also serves as a request signal for the DMA controller so that the operation of the DMA 21 is also initiated. Upon start of the operation of the DMA 21, the signal DACK becomes low level and DRQ is cleared. And, while DACK is low level, a signal CCD RD is set low level, so that an 8-bit parallel data is output from the flip-flop 55 to the bus to be stored into the DRAM 26. In this event, all of the data VIDEO from the CCD image sensor 17 are stored, for example, in the order of $n+1$, $n+2$, $n+3$, . . ., $n+8$, etc.

Figure 20:
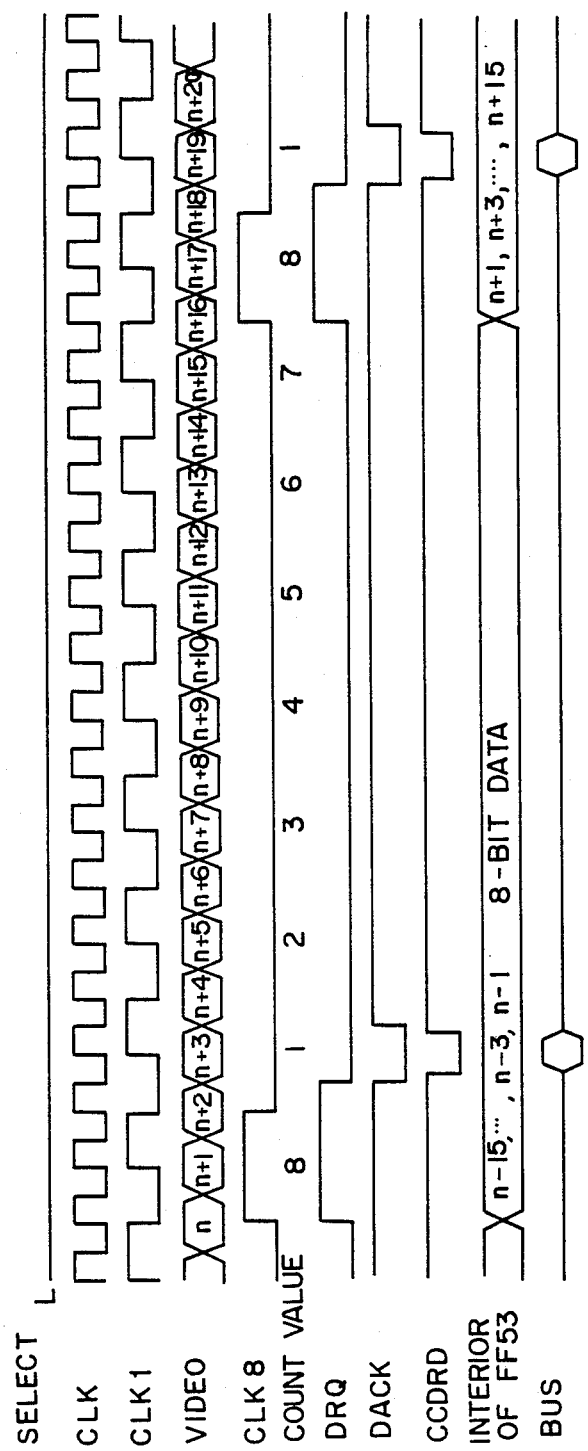
Figure 21:
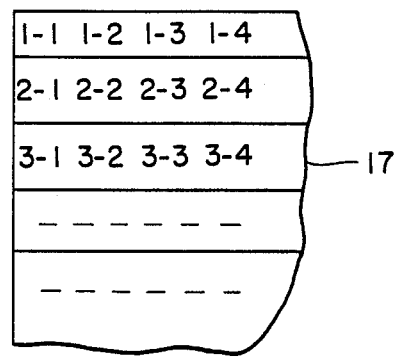
FIGS. 21 and 22a and 22b are schematic illustrations which are useful for explaining how information written on the writing medium can be reproduced on a hard copy on a reduced scale in accordance with the present invention.
Figure 22A:
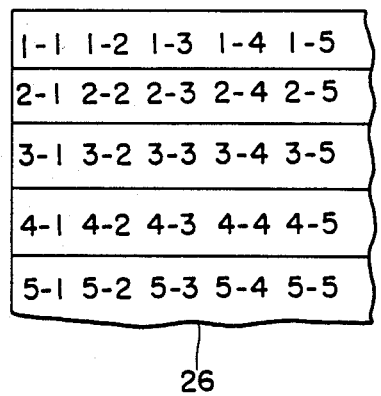
Figure 22B:
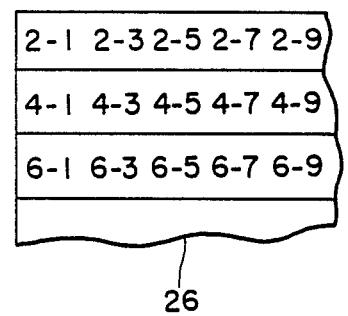

On the other hand, in the case of other copy modes, such as long copy mode, and 2-page or 4-page copy mode, a size reduction is required so that size reduction processing takes place. This will be described with particular reference to the timing chart shown in FIG. 20. When one of these copy modes, requiring size reduction, is selected, the signal SELECT becomes low level to activate the frequency divider 58 so that CLK1 becomes, for example, half the frequency of CLK. Thus, every other data is supplied from the flip-flop 55 onto the bus, such as $n+1$, $n+3$, $n+5$, . . ., $n+15$, etc. It is to be noted that storing of data into the DRAM 26 by the DMA controller is carried out by setting the front address of the DRAM 26 and the number of data for one line for each line. And, for the normal or standard copy mode, the data for all of the lines are stored into the DRAM 26. However, in a size reduction copy mode, the data are stored into the DRAM 26 every other line. In the present embodiment, the same front address of the DRAM 26 is set twice consecutively and the data of the two consecutive lines are written in the same address twice in a consecutive fashion, thereby overwriting the data of the next line on the data of the previous line. FIGS. 21 and 22 illustrate how this is done. That is, the image data obtained from the CCD image sensor 17 is shown in FIG. 21, and, as shown, the first line contains image data consisting of 1-1, 1-2, 1-3, etc. and the second line contains image data consisting of 2-1, 2-2, 2-3, etc. In the case of the standard copy mode, all of the image data are written into the DRAM 26 as illustrated in FIG. 22a; whereas, in the case of a multi-page copy mode requiring size reduction, such as long and 2-page or 4-page copy modes, all of the image data are not stored into the DRAM 26 but they are stored into the DRAM 26 every other data and every other line. In this manner, in the case of a multi-page copy mode, the image data is stored into the DRAM 26 with some of them being omitted in a predetermined fashion, two or more pages of image data may be stored into the DRAM 26 according to the degree of frequency division, thereby allowing to print two or more pages of information on the same copy sheet of paper having a predetermined size.

Figure 23:
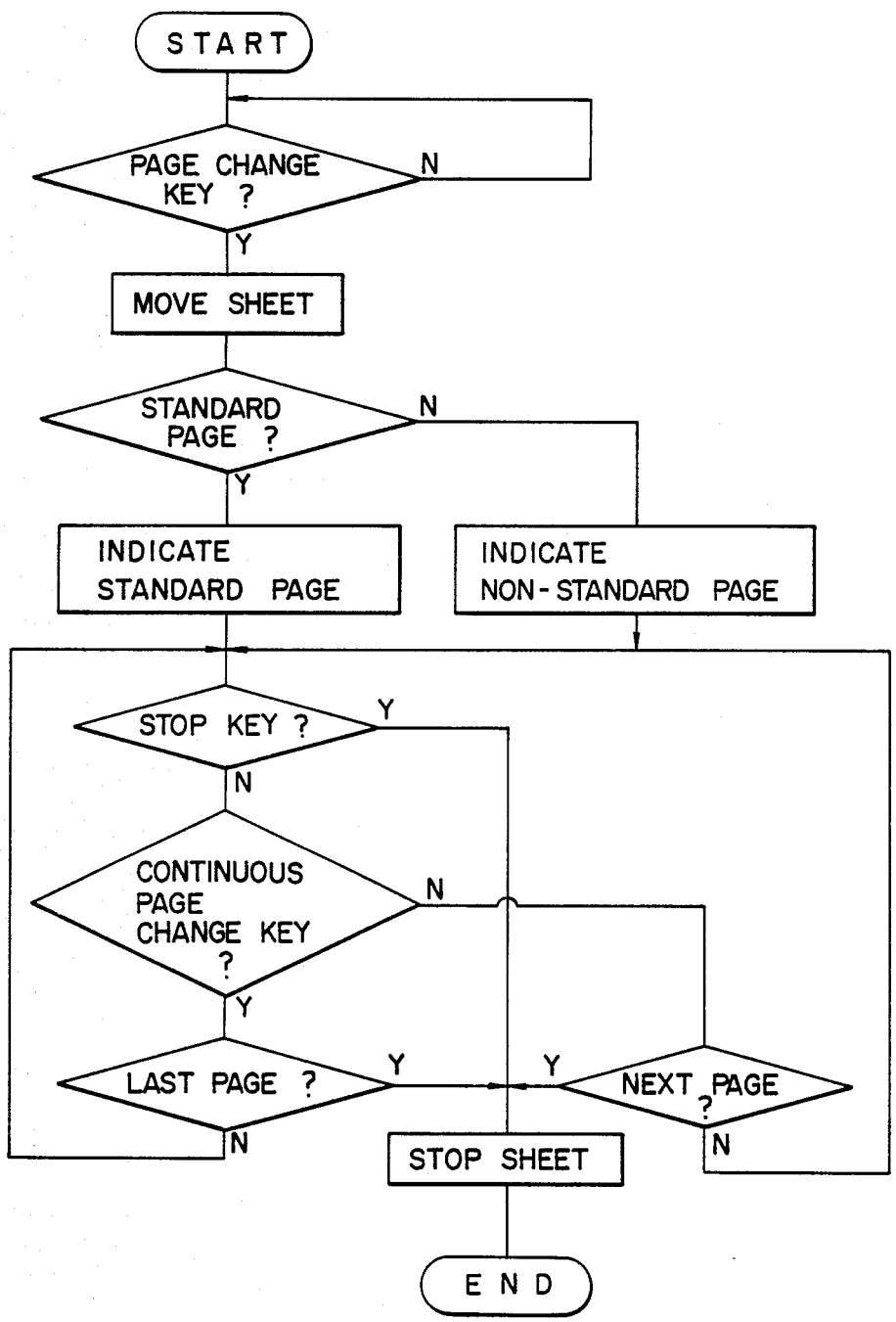
FIG. 23 is flow chart showing the sequence of steps of one mode of operation of an electronic blackboard embodying the present invention.

Now, the operation of moving the writing sheet 2 in the present embodiment will be described in detail with reference to the flow chart shown in FIG. 23. The movement of the writing sheet 2 in the forward or backward direction commences upon depression of either one of the keys 47a and 47b at the control panel 32. Depending on which of the keys 47a and 47b has been depressed, either one of the pulse motors 10 and 11 starts to be driven to rotate. In the present embodiment, the writing sheet 2 may be stopped with its one of the pages in registry or out of registry with the opening 1a. It may be so structured that the writing sheet 2 is stopped immediately upon depression of the stop key 42 or the writing sheet 2 is stopped when the sensor 19 has detected the first detector hole after depression of the stop key 42. In any event, when the writing sheet 2 has been brought to a halt, the condition of the writing sheet 2 is checked to determine whether or not any page of the writing sheet 2 is in registry with the opening 1a, and, if any one of the pages of the writing sheet 2 is, in fact, in registry with the opening 1a, then the page number of that page appearing at the opening 1a is indicted at the page indicator 52 of the control panel 32. That is, the page indicator 52 includes seven segments 52a arranged in the form of number eight, which are selectively activated or lit to indicate any desired number corresponding to the page now located in registry with the opening 1a. On the other hand, in the case of no page being in registry with the opening 1a when the writing sheet 2 has been brought to a halt, the segments 52a of the page indicator are flickered. With the above-described structure, since the page indicator operates differently depending on whether any page of the writing sheet 2 is in registry with the opening 1a, the operator or user of the electronic blackboard is well advised of this fact.

In the present embodiment, in addition to the page change keys 47a and 47b, the continuous page change key 48 is provided, so that if it is desired to locate page $P_5$ in registry with the opening 1a, though page $P_1$ is currently located in registry with the opening 1a, or vice versa, the operator is only required to depress the continuous page change key 48 together with either one of the page change keys 47a and 47b because the writing sheet 2 will be moved in either direction until desired page $P_5$ comes to be located in registry with the opening 1a. In other words, in accordance with this embodiment, when the continuous page change key 48 is depressed the writing sheet 2 will be continuously moved in a direction determined by the depression of either one of the keys 47a and 47b until the last page when viewed in the current direction of movement of the writing sheet 2 comes to be located in registry with the opening 1a irrespective of which page is now in registry with the opening 1a.

Figures 24, 25:
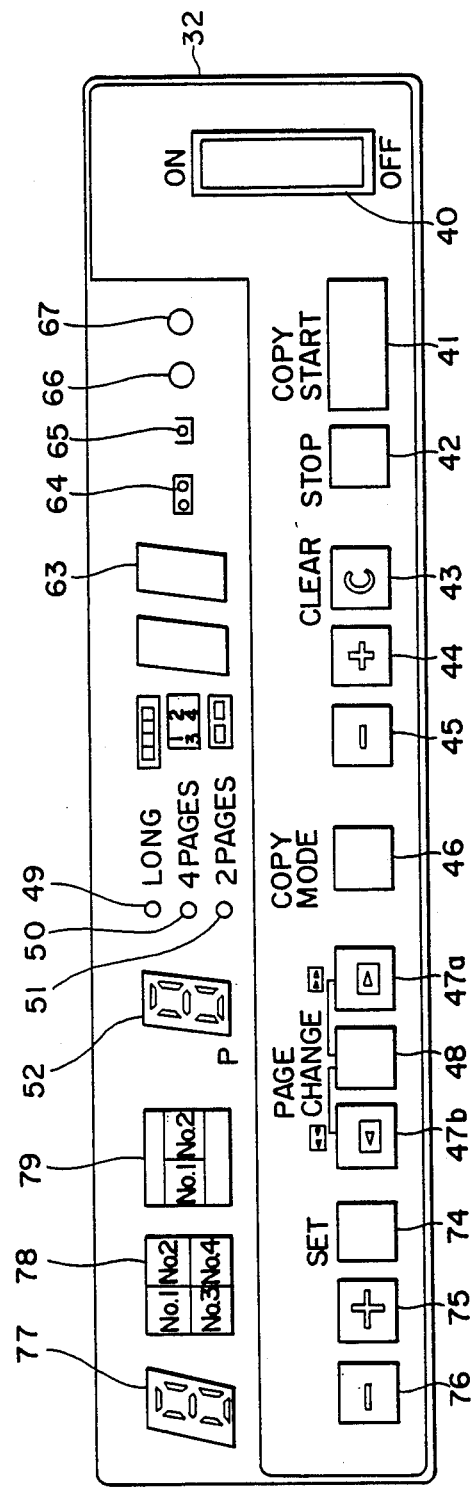
FIG. 24 is schematic illustration showing the structure of a page number display provided on the control panel of the electronic blackboard.
FIG. 25 is a schematic illustration showing the overall structure of another embodiment of the control panel suitable for use in the electronic blackboard.

FIG. 25 shows a control panel 32 constructed in accordance with another embodiment of the present invention for use in the electronic blackboard shown in FIG. 1. The control panel 32 of FIG. 25 is similar in many respects to the control panel of FIG. 15, so that like elements are indicated by like numerals. That is, the control panel 32 shown in FIG. 25 includes the power switch 40, copy start key 41, stop key 42 for stopping the movement of the writing sheet 2, clear key 43 for clearing the set number of copies, "+" key 44 for increasing the number of copies, "−" key 45 for decreasing the number of copies, copy mode key 46 for setting a copy mode, such as standard copy mode or multi-page copy mode, including long copy, 2-page copy, and 4-page copy modes, page change or feed direction keys 47a and 47b for moving the writing sheet in the forward or backward direction, and continuous page change key 48 for moving the writing sheet 2 in a desired direction set by depression of either one of the direction keys 47a and 47b until the last page with respect to the current direction of movement comes to be in registry with the opening 1a.

The control panel 32 shown in FIG. 25 further includes multi-page copy mode indicators including long page copy mode indicator 49, 4-page copy mode indicator 50, and 2-page copy mode indicator 51, which are selectively lit when the corresponding copy mode has been selected. Also provided is the page indicator 52 which indicates the number of page currently appearing at the opening 1a. In addition, a copy number indicator 63 comprised of a seven-segment light-emitting diode device for indicating the number of copies to be made, a key counter indicator 64, a paper end indicator 65, a "wait" indicator 66, and a "copy OK" indicator 67 are also provided.

In accordance with this embodiment, it is so structured that one or more selected pages of the writing sheet 2 may be reproduced on the same sheet of paper. This will be described more in detail below with particular reference to FIGS. 26a through 26d and FIGS. 27a through 27g. That is, as shown in FIGS. 26a through 26d, the present embodiment is so structured that one or more selected pages of the writing sheet 2 may be reproduced on the same sheet of paper. For example, FIG. 26a corresponds to the standard copy mode, in which a single selected page from the writing sheet 2 is reproduced on a copy sheet of paper 53 having a predetermined size on an one-to-one basis or without reduction in size. On the other hand, FIGS. 26b through 26d correspond to the multi-page copy mode, in which two or more selected pages from the writing sheet 2 are reproduced on the same copy sheet 53. For example, FIG. 26b corresponds to the 2-page copy mode, in which any two pages selected from the writing sheet 2 are reduced in size, for example, by half or ¼ and reproduced at areas indicated by No. 1 and No. 2 on a copy sheet of paper 53 having a predetermined size. It is to be noted that No. 1 and No. 2 in FIG. 26b does not necessarily correspond to the page number of the writing sheet 2 and they simply indicate the particular area of the copy sheet of paper 53 in which any image of selected page may be reproduced. Thus, for example, it may be so selected that page 3 be reproduced in the No. 1 area while reproducing page 2 in the No. 2 area. FIG. 26c shows the 4-page copy mode, in which four particular areas No. 1 through No. 4 are reserved, so that any four pages selected from the writing sheet 2 may be reproduced in the desired areas No. 1 through No. 4 of the copy sheet of paper 53 having a predetermined size as reduced in size, for example, by ¼. On the other hand, FIG. 26d shows the long copy mode, in which selected consecutive pages, or three pages in the illustrated example, from the writing sheet 2 may be reproduced on the same copy sheet of paper 53 having a longer size, including the space between the two consecutive pages.

Several examples of copies obtained in the present embodiments are illustrated in FIGS. 27a through 27g. That is, FIG. 27a shows a copy sheet of paper 53 which has been obtained to reproduce the information of the first page P₁ by the standard copy mode of unity magnification. FIGS. 27b and 27c show the case of the 2-page copy mode, in which the first and third pages of the writing sheet 2 have been reproduced at the No. 1 and No. 2 areas, respectively, in FIG. 27b and the fourth and second pages of the writing sheet 2 have been reproduced at the No. 1 and No. 2 areas, respectively, in FIG. 27c. FIGS. 27d through 27g show the case of the 4-page copy mode, wherein four desired pages are reproduced as located at desired areas. It is to be noted that in FIG. 27g P0 indicates the absence of reproduced image, and, thus, only three pages have been selected from the writing sheet 2 for reproduction in the case of FIG. 27g.

In this connection, the control panel 32 of FIG. 25 is further provided with a print page set key 74, a page up key 75 for increasing the page number, and a page down key 76 for decreasing the page number. The control panel 32 of FIG. 25 is also provided with a print page indicator 77 comprised of a seven-segment light-emitting diode device for indicating the page number to be reproduced, a 4-page copy mode indicator 78 for indicating the arrangement of four pages to be reproduced on the same copy sheet of paper, and a two-page copy mode 79 for indicating the arrangement of two pages to be reproduced on the same copy sheet of paper. In particular, in the case of the 4-page copy mode, its sequence of operational steps will be described in detail below.

In the first place, the copy mode set key 46 is depressed to set the 4-page copy mode. Thus, the 4-page copy mode indicator 50 is lit to indicate that the 4-page copy mode has been selected. Then, by operating the up key 75 or down key 76, a desired page number is caused to be indicated at the print page indicator 77 while No. 1 area in the 4-page set sequence indicator 68 is lit. When the desired page number has been set at the print page indicator 77, the print page set key 74 is depressed so that the desired page number is set for the No. 1 area. Similarly, desired page numbers are set for each of the remaining three areas No. 2 through No. 4. If one of the areas No. 1 through No. 4 is desired to be a blank page, as indicated by P0 in FIG. 27g, then the up and down keys 75 and 76 are operated such that number 0 is indicated at the print page number 77 and then the print page set key 74 is depressed. It is to be noted that the present embodiment also has a default condition in arrangement of pages in the multi-page copy mode. That is, if the copy start key 41 is depressed without selection of particular arrangement of pages as described above, consecutive pages are reproduced as arranged in the order of the area number.

There are basically two schemes for processing the image data in the present embodiment. In accordance with the first scheme, at the time of storing the image data obtained by the CCD image sensor 17 into the DRAM 26, the memory address for each line scanned by the CCD image sensor 17 is set at a position corresponding to one of the predetermined print positions, e.g., No. 1 through No. 4, so that the image data is stored into the DRAM 26 in a pattern corresponding to the selected copy mode. On the other hand, in accordance with the second scheme, the image data read by the CCD image sensor 17 is stored into the DRAM 26 in the order read as normally done, but when the printing is to be carried out by the thermal print head 25, the image data is supplied from the DRAM 26 to the thermal print head 25 by accessing particular memory addresses in the order designated by the operator by operating various keys of the control panel 32 as described above.

Figure 28A:
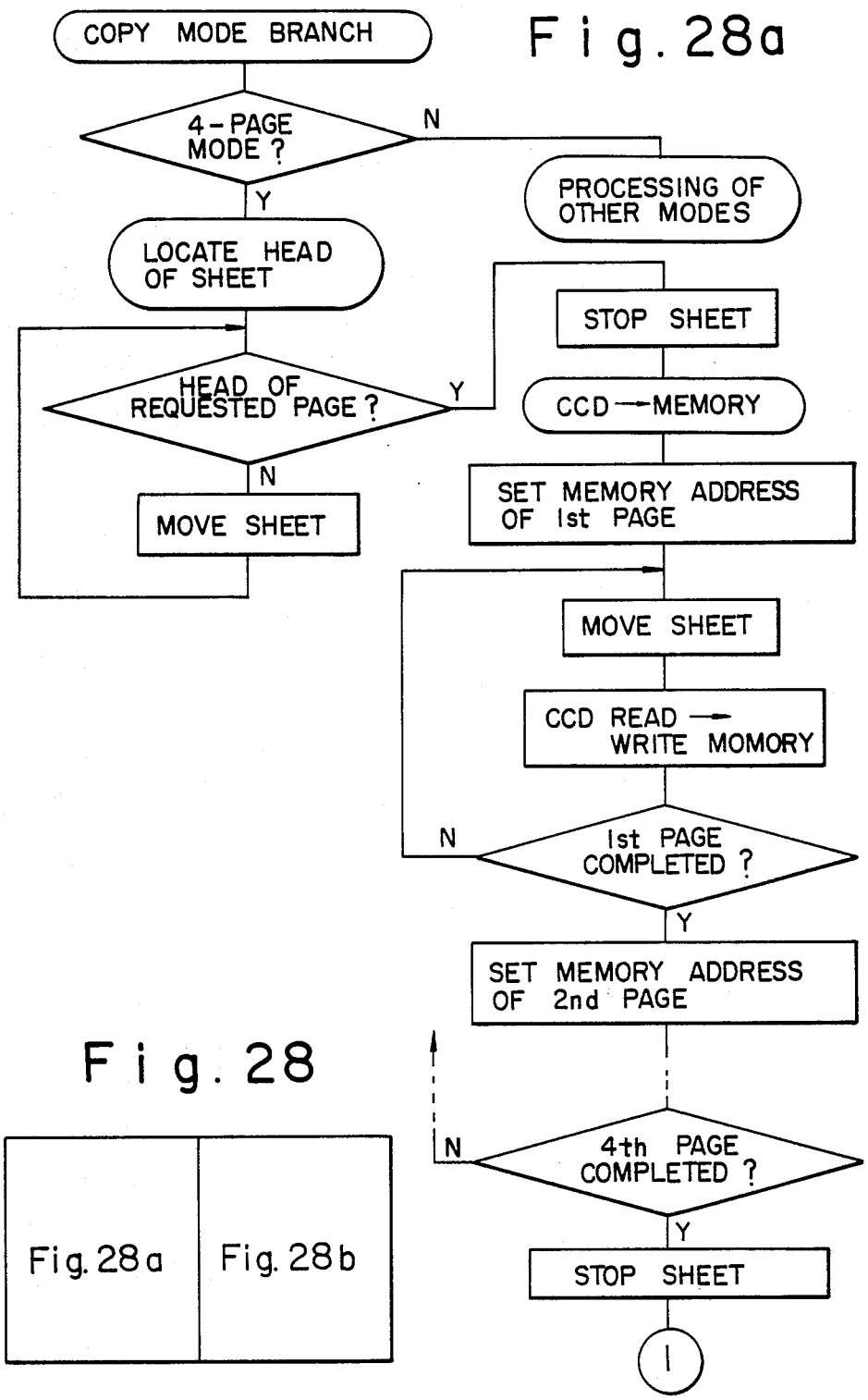
FIGS. 28, 28a, 28b, 29, 29a and 29b are flow charts which are useful for explaining other modes of operations which can advantageously be carried out with the present electronic blackboard.
Figure 28:
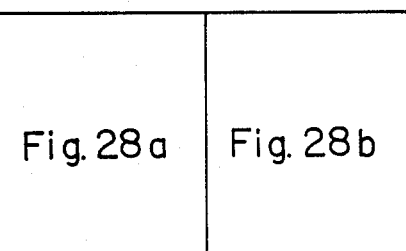
Figure 28B:
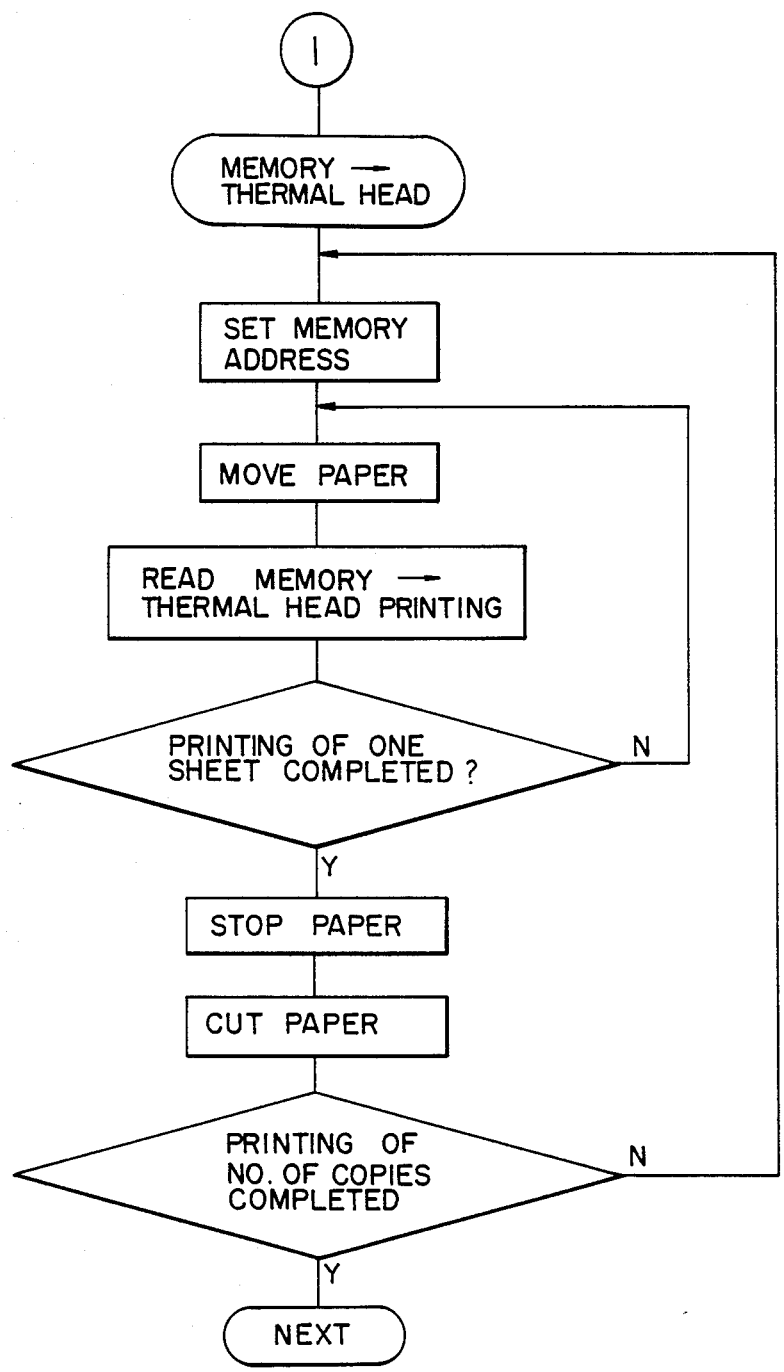

The sequence of steps in the first scheme for the 4-page copy mode will be described more in detail with reference to the flow chart shown in FIG. 28. When the 4-page copy mode has been selected by depressing the copy mode key 46, the initialization step takes place to set the writing sheet 2 in its initial position, which is followed by the step of moving the writing sheet 2 until a designated page comes to be located in registry with the opening 1a. Then, it proceeds to a step for transmitting image data obtained by the CCD image sensor 17 to the DRAM 26. In this case, at first, the memory address for the first page is set. That is, this is a step to designate a front address so as to have the image data of the first page stored into the address of the DRAM 26 which corresponds to a selected one of the four predetermined areas No. 1 through No. 4. When the address has been determined, the writing sheet 2 is moved and the image data obtained by the CCD image sensor 17 by scanning the writing sheet 2 is stored into the DRAM 26 at the address thus determined. Upon completion of storing the image information for the first page, the memory address for the second page is set to be located at another one of the four predetermined areas, and, then, storing of the image data of the second page into the DRAM 26 at another address thus determined is carried out. Upon completion of storing of image data of four pages into the DRAM 26 in this manner, it proceeds to a step for supplying the image data thus stored in the DRAM 26 to the thermal print head 25. At first, the memory address is set. That is, the front address of the image data to be read out of the DRAM 26 is set. Of course, this always remains the same address because addressing has already been carried out at the time of storing the image information into the DRAM 26. Then, a copy sheet of paper, typically thermosensitive paper, is supplied while supplying the image data from the DRAM 26 to the thermal print head 25 to carry out printing. If it has been set to make more than one copy for the same information, the printing operation is repeated over a set number of times. After each printing, the supply of copy sheet of paper is stopped and cut to a desired size.

Figures 29, 29A:
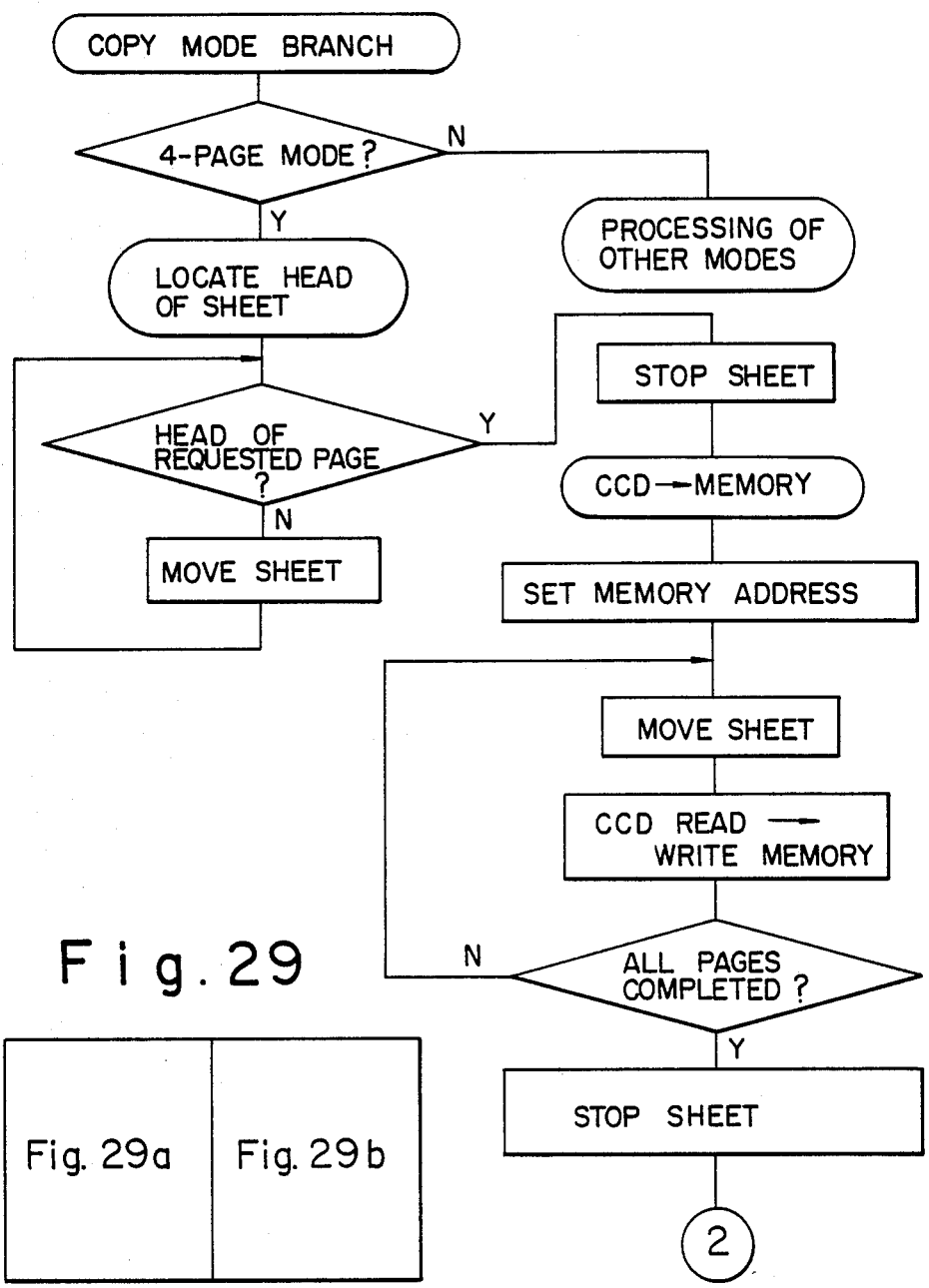
Figure 29B:
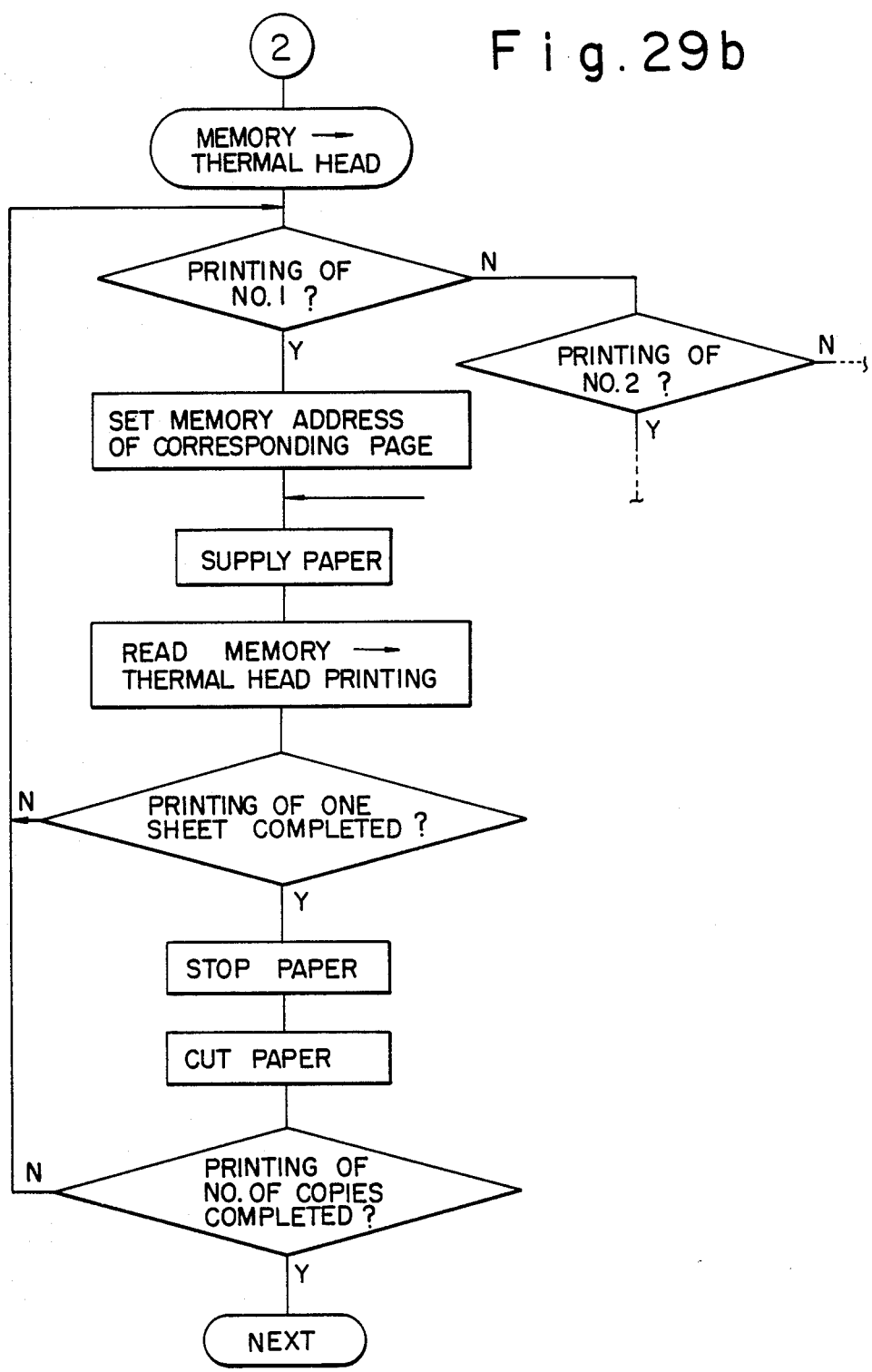

Next, the sequence of steps according to the second scheme will be described in detail with reference to the flow chart shown in FIG. 29. Similarly with the previous case, the writing sheet 2 is moved until a desired page comes to be located in registry with the opening 1a. Then, it proceeds to a step for transmitting image data from the CCD image sensor 17 to the DRAM 26. In the present scheme, the image data is stored into the DRAM 26 in the order as received from the CCD image sensor 17. Upon completion of storing of the image data for all of the required pages of the writing sheet 2 into the DRAM 26, it proceeds to a step for transmitting the image data from the DRAM 26 to the thermal print head 25. At this time, in the present scheme, a particular address of the DRAM is set depending on the corresponding page of information to be printed. For example, if it is the printing for No. 1 area, the corresponding memory address is set and the image data at this memory address is supplied to the thermal print head while feeding a copy sheet of paper. Similar operations are carried out also for the other print areas No. 2 through No. 4.

It is to be noted that only the 4-page copy mode has been described above, similar operations are carried out also for the 2-page copy mode. In accordance with the present embodiment, any desired page of information written on the writing sheet 2 may be reproduced on any one of predetermined print areas No. 1 through No. 4 in the case of the 4-page copy mode and No. 1 and No. 2 in the case of the 2-page copy mode, as desired. Thus, even if information has been written in two or more pages of the writing sheet 2, the information may be reproduced on copy sheets in any desired order While the above provides a full and complete disclosure of the preferred embodiment of the present invention, various modifications, alternate constructions and equivalents may be employed without departing from the true spirit and scope of the invention. Therefore, the above description and illustration should not be construed as limiting the scope of the invention, which is defined by the appended claims

What is claimed is:

1. An electronic blackboard comprising:
    a writing sheet in the form of a web movable along a predetermined path which includes a window through which information may be manually written on said writing sheet, and said writing sheet having a plurality of writing sections and a standard concentration pattern comprising a first concentration pattern section, and a second concentration pattern section which differs in concentration level from said first concentration pattern section, said standard concentration pattern being located on said writing sheet so as not to be exposed through said window;
    driving means for driving said writing sheet along said predetermined path back and forth relative to said window;
    reading means for reading said writing sheet to produce image data;
    processing means for processing said image data produced by said reading means, said processing means including converting means for converting said image data into binary image data using a variably set threshold level and adjusting means for adjusting said threshold level to be between density levels corresponding to said first and second concentration pattern sections determined by reading said concentration pattern sections of said standard concentration pattern by said reading means; and
    recording means responsive to said processing means for recording desired image on said writing sheet read by said reading means on a sheet of copy paper.

2. The electronic blackboard of claim 1 wherein said writing sheet has a predetermined length having both ends connected to a pair of rollers and said driving means is operatively coupled to at least one of said pair of rollers so as to move said writing sheet in a desired direction.

3. The electronic blackboard of claim 2 further means for setting said writing sheet in its initial position upon power up.

4. The electronic blackboard of claim 1 further comprising a housing which is provided with an opening which exposes said writing sheet partly at a location along said predetermined path.

5. The electronic blackboard of claim 4 further comprising a rear plate disposed extending along and behind said writing sheet and substantially across said opening.

6. The electronic blackboard of claim 4 wherein said reading means includes a light source for illuminating said writing sheet at an exposure section, a CCD image sensor and an optical system for leading the light reflecting from said writing sheet at said exposure section to said CCD image sensor.

7. The electronic blackboard of claim 1 wherein said first pattern section is a light pattern section and said second pattern section is a dark pattern section, whereby said adjusting means adjusts said threshold level to be a means level between said light and dark pattern sections.

8. The electronic blackboard of claim 7 wherein said light and dark pattern sections are arranged along an imaginary line extending across the width of said writing sheet.

9. An electronic blackboard comprising:
    a writing sheet movable along a predetermined path, which includes a window, and having a plurality of writing sections, which are previously determined on said writing sheet by subdivision with each corresponding substantially to said window in size;
    moving means for moving said writing sheet along said predetermined path;
    reading means for reading said writing sheet;
    recording means responsive to said reading means for recording information read by said reading means on a recording medium;
    controlling means for controlling the operation of said electronic blackboard, said controlling mans controlling said moving means to stop said writing sheet in a first stop mode, in which said writing sheet is stopped with one of said plurality of writing sections in registry with said window, or in a second stop mode, in which said writing sheet is stopped with none of said plurality of writing sections in registry with said window; and
    indicating means for indicating whether said writing sheet is in said first stop mode or said second stop mode, wherein the manner of indicating that the writing sheet is in said second stop mode differs from the manner of indicating that the writing sheet is in said first stop mode.

10. The electronic blackboard of claim 9 wherein said indicating means flickers when in said second stop mode.

11. An electronic blackboard comprising:
    a writing sheet movable along a predetermined path, which includes a window, and having a plurality of writing sections, which are previously determined on said writing sheet by subdivision with each corresponding substantially to said window in size;
    moving means for moving said writing sheet along said predetermined path so as to bring a next adjacent writing section in registry with said window in a first mode and to bring a last writing section with respect to the direction of movement of said writing sheet in registry with said window in a second mode;
    reading means for reading said writing sheet;
    recording means responsive to said reading means for recording information read by said reading means on a recording medium; and
    selecting means for selecting either one of said first and second modes, said selecting means normally selecting said first more and said selecting means being manually operated only when said second mode is to be selected, and said selecting means also selecting the direction of movement of said writing sheet along said predetermined path.

12. The electronic blackboard of claim 11 wherein said selecting means includes a pair of first and second direction switches, whereby said writing sheet is moved in a first direction along said predetermined path when said first direction switch is operated and said writing sheet is moved in a second direction opposite to said first direction when said second direction switch is operated.

13. An electronic blackboard comprising:
a writing sheet in the form of a web movable along a predetermined path including a window through which information may be manually written on said writing sheet, sand having a plurality of writing sections, which are previously determined on said writing sheet by subdivision with each corresponding substantially to said window in size;
moving means for moving said writing sheet along said predetermined path back and forth;
reading means for reading said writing sheet;
recording means responsive to said reading means for recording information read by said reading means on a recording medium, said recording means having a first recording mode, in which information written on one of said plurality of writing sections is recorded on as single recording medium, and a second recording mode, in which information written on two or more of said plurality of writing sections is recorded on a single recording medium; and
selecting means for selecting either one of said first and second recording modes.

14. The electronic blackboard of claim 13 further comprising reducing means for reducing the size of information written in each of said plurality of writing sections when said second recording means is selected by said selecting means.

15. The electronic blackboard of claim 14 wherein said reducing means reduces the size of information written in each of said plurality of writing sections by discarding image data in a predetermined fashion.

16. The electronic blackboard of claim 15 further comprising designating means for designating a particular arrangement of said information of said two or more of said plurality of writing sections to be recorded on a single recording medium.

* * * * *